(12) United States Patent
Toyoda

(10) Patent No.: US 7,470,407 B2
(45) Date of Patent: *Dec. 30, 2008

(54) CARBON PARTICLE REDUCING APPARATUS

(75) Inventor: Tetsuro Toyoda, Tokyo (JP)

(73) Assignee: Clean Diesel Technologies, Inc., Stamford, CT (US)

( * ) Notice: Subject to any disclaimer, the term of this patent is extended or adjusted under 35 U.S.C. 154(b) by 752 days.

This patent is subject to a terminal disclaimer.

(21) Appl. No.: 10/401,482

(22) Filed: Mar. 28, 2003

(65) Prior Publication Data

US 2003/0185722 A1 Oct. 2, 2003

(30) Foreign Application Priority Data

Apr. 2, 2002 (JP) ............................. 2002-099846

(51) Int. Cl.
*B01D 50/00* (2006.01)
(52) U.S. Cl. ...................... 422/177; 422/168; 422/171; 422/179; 55/502; 55/501; 55/527; 55/498; 55/497; 55/500; 55/488; 55/489; 55/490; 55/492
(58) Field of Classification Search ................. 422/171, 422/180, 179, 177
See application file for complete search history.

(56) References Cited

U.S. PATENT DOCUMENTS

| | | | |
|---|---|---|---|
| 3,989,471 A | 11/1976 | Nowak | ........................ 422/179 |
| 4,374,803 A | 2/1983 | Fratzer et al. | ................ 422/176 |
| 5,042,249 A | 8/1991 | Erdmannsdoerfer | .......... 60/299 |
| 5,195,319 A | 3/1993 | Stobbe | ......................... 60/303 |
| 5,293,742 A | 3/1994 | Gillingham et al. | ........... 60/288 |
| 5,458,664 A * | 10/1995 | Ishii et al. | ....................... 55/282 |
| 5,484,575 A | 1/1996 | Steenackers | ................. 422/176 |
| 5,828,013 A * | 10/1998 | Wagner et al. | ............... 181/255 |
| 6,235,254 B1 * | 5/2001 | Murphy et al. | ............... 423/212 |
| 6,387,143 B1 | 5/2002 | Adiletta | |
| 2002/0128151 A1* | 9/2002 | Galligan et al. | .............. 502/302 |

FOREIGN PATENT DOCUMENTS

| EP | 0 220 505 | 9/1986 |
|---|---|---|
| EP | 1262641 B1 | 12/2002 |

* cited by examiner

*Primary Examiner*—Alexa D. Neckel
*Assistant Examiner*—Kaity V. Handal
(74) *Attorney, Agent, or Firm*—Thaddius J. Carvis

(57) ABSTRACT

A reducing apparatus 16 for carbon particles PM is provided with one or more filters 19 of a wire mesh structure. The filter 19 is formed in a substantially short column-shape and is provided with a central through-hole 21 and a pair of exhaust ducts 26. The filter 19 is situated within an outer cylindrical casing 4 on an axis perpendicular to the axis of the outer cylindrical casing 4. Exhaust gas 1 discharged from a diesel engine flows from an outer periphery 22 side of the filter 19 to the central through-hole 21 side, wherein the carbon particles PM contained in the exhaust gas 1 are captured, burned and reduced. A plurality of filters 19, each formed in a hollow cylinder-shape, can also be provided side by side in the same direction as the axis of the outer cylindrical casing 4.

9 Claims, 11 Drawing Sheets

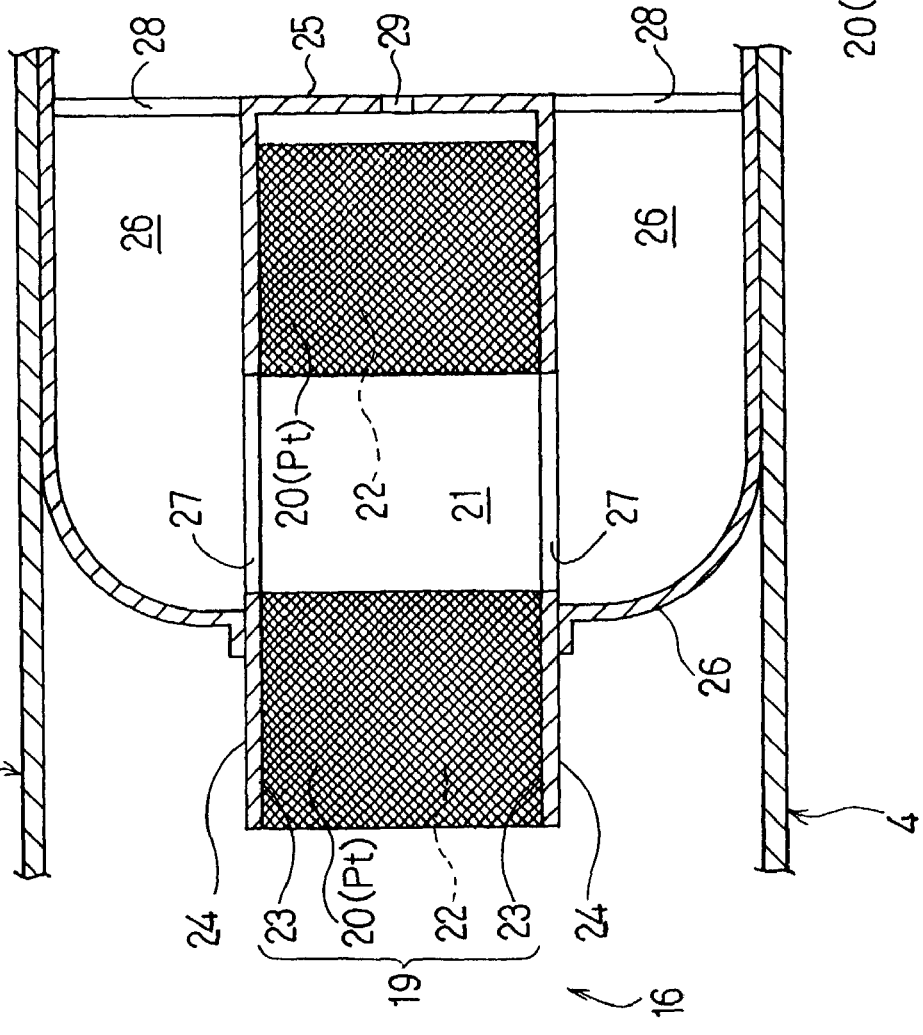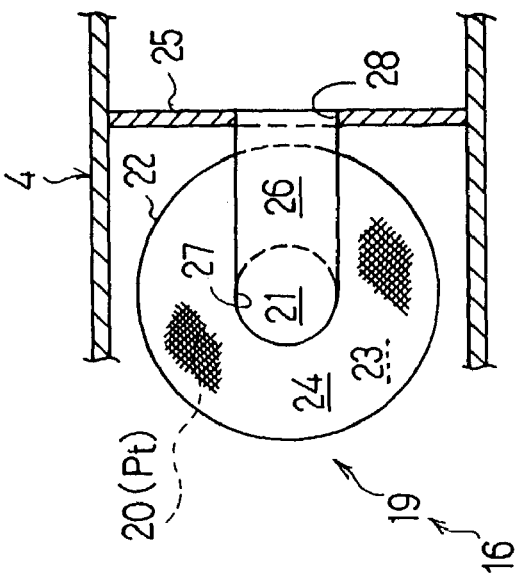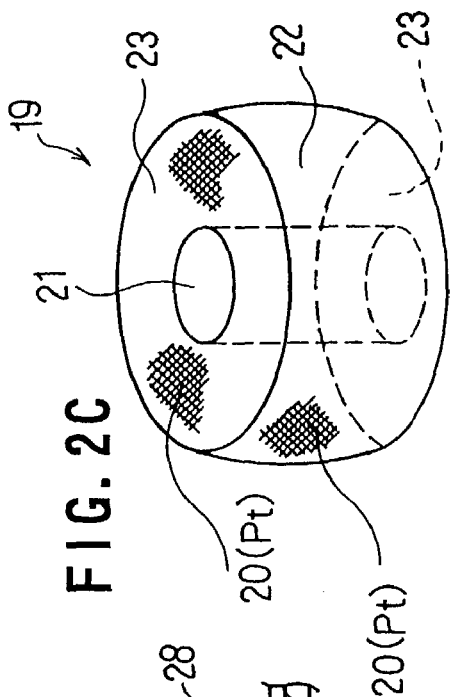

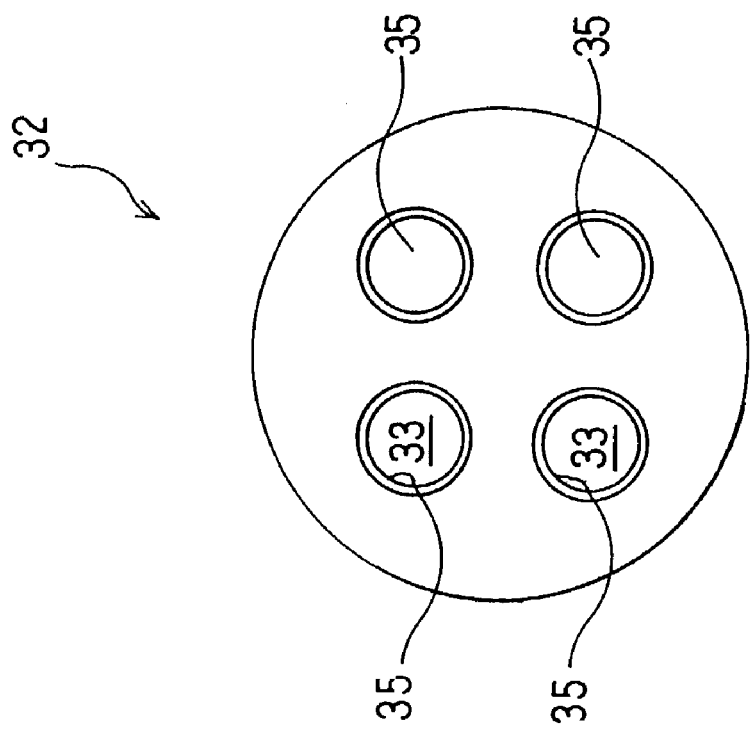
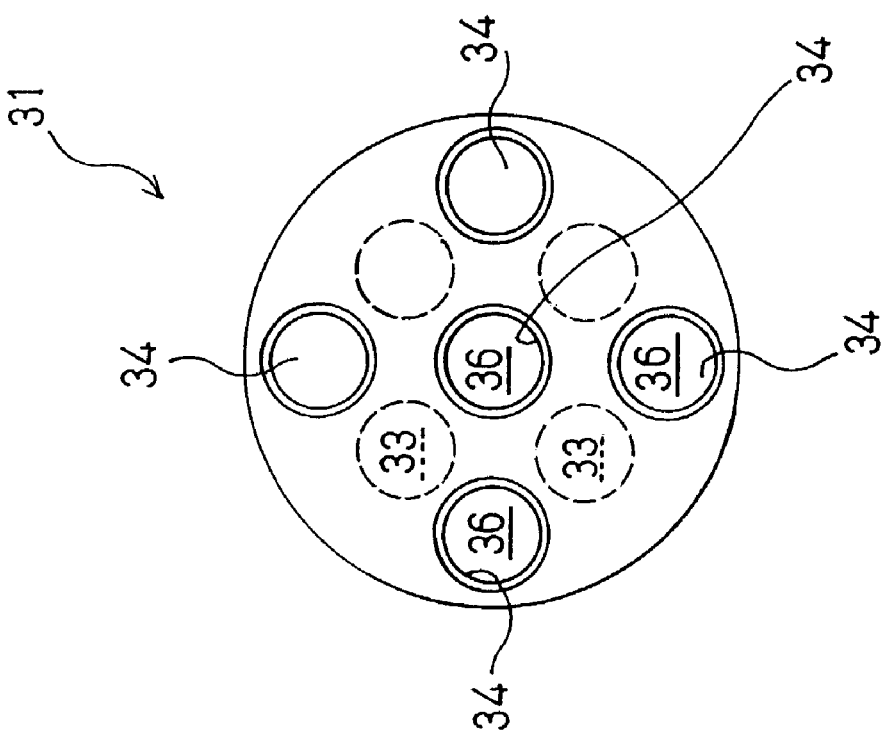
FIG. 7B
FIG. 7A

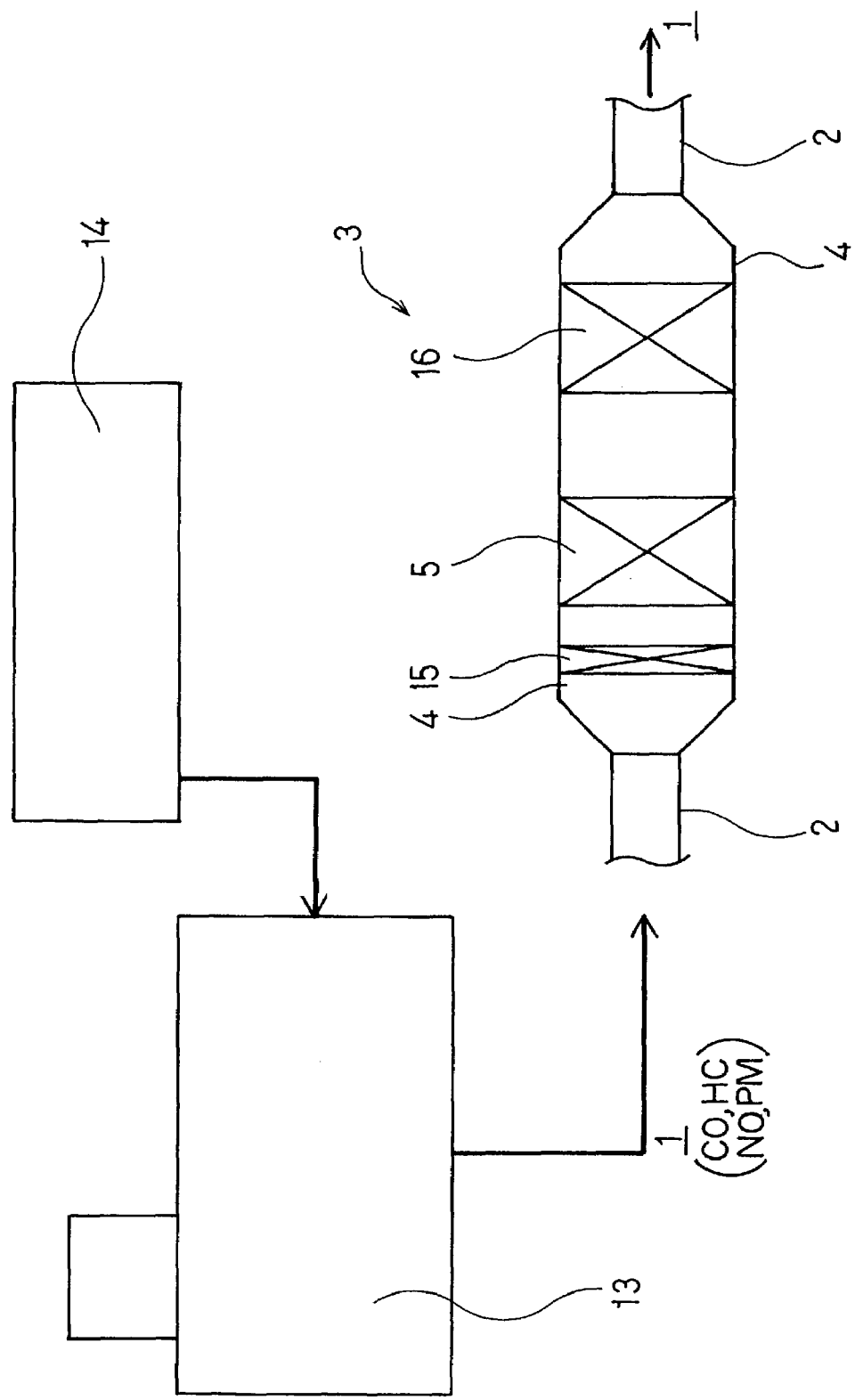

CARBON PARTICLE REDUCING APPARATUS

BACKGROUND OF THE INVENTION

1. Field of the Invention

The present invention relates to a reducing apparatus for carbon particles. More particularly, the present invention relates to a reducing apparatus for carbon particles which can capture, accumulate, burn and reduce the carbon particles contained in the exhaust gas of a diesel engine.

2. Description of the Prior Art

Exhaust gas from a diesel engine contains fine particles of carbon, i.e., carbon particles PM (particle matter) which are the soot, generated by the incomplete combustion of a fuel.

If such carbon particles PM are directly discharged to the open air, they are harmful to the human body and the environment. It is therefore an important theme to reduce the carbon particles.

<<Prior Art 1>>

FIG. 10 is an explanatory cross-sectional view showing a conventional example of a reducing apparatus for carbon particles PM and the like. As shown in the figure, a catalytic converter 3 is set in an exhaust pipe 2 for exhaust gas 1 discharged from a diesel engine in the prior art. The catalytic converter 3 is provided with a purifier 5 for purifying carbon monoxide CO and hydrocarbon HC, and a reducing apparatus 6 for carbon particles PM in that order within an outer cylindrical casing 4.

In the purifier 5, cell walls 8 of a honeycomb core 7 adhere together and are coated with an oxidation catalyst such as platinum Pt. The purifier 5 oxidizes, burns and reduces carbon monoxide CO and hydrocarbon HC which are harmful substances in the exhaust gas 1, and causes nitrogen oxide NO in the exhaust gas 1 to oxidize into nitrogen dioxide $NO_2$.

In the reducing apparatus 6 for carbon particles PM, pore walls 10 of a high-density porous ceramics-made filter 9 adhere together and are coated with an oxidation catalyst such as platinum Pt. The reducing apparatus 6 is provided to capture, accumulate, oxidize, burn, and reduce the carbon particles PM which are harmful substances in the exhaust gas 1.

<<Prior Art 2>>

FIG. 11 is an explanatory cross-sectional view showing another example of a conventional reducing apparatus for carbon particles PM and the like. A reducing apparatus 11 shown in the figure has been recently developed by an inventor of the present invention, wherein a filter 12 of a wire-mesh structure formed in a substantially column-shape is set within an outer cylindrical casing 4 on the same axis and with the same diameter as the casing 4.

An oxidation catalyst such as platinum Pt is caused to adhere to the wire of the filter 12 and to be coated thereon. The filter 12 captures, accumulates, burns, and reduces the carbon particles PM in the exhaust gas 1 in the same manner as the filter 9 of the reducing apparatus 6 described above.

In the converter 3 of FIG. 11, the purifier 5 also follows the description of FIG. 10.

<<First Problem>>

The following problems have been recognized in such conventional examples. First, a serious problem has been pointed out in that the reducing apparatus 6 for carbon particles PM shown in FIG. 10 is easily caused to break by heating when used.

Namely, in this reducing apparatus 6, after a large amount of carbon particles PM is captured and accumulated by each pore wall 10 of the high-density porous filter 9 made of ceramics, these carbon particles PM are burnt and reduced at one time. In this case, the capture rate and reduction rate of the carbon particles PM amount to 95% or more. Since these carbon particles PM are burnt all together, a sharp rise of temperature of the filter 9 occurs, and the maximum temperature almost reaches 1,200K.

Thus, it is pointed out that the reducing apparatus 6 has a problem in that the filter 9 easily beaks by heating under a high temperature when used.

Namely, once the reducing apparatus 6 and the filter 9 capture, accumulate, burn, and reduce the carbon particles PM, the reducing apparatus 6 and the filter 9 are then regenerated to again capture, accumulate, burn, and reduce new carbon particles PM. In this manner, the reducing apparatus 6 and the filter 9 are expected to repeat a series of cycles of capture, accumulation, burning, and reduction of the carbon particles PM. However, the problem is pointed out that the reducing apparatus 6 and the filter 9 have short lives, are not very durable, and the cost burden is heavy because breakage from heating is easily accelerated to lead to destruction in about a week.

<<Second Problem>>

Second, it has been pointed out that sulfur S contained in the exhaust gas 1 affects accumulation by capture of carbon particles PM and reduction by burning thereof.

Namely, the sulfur S in oil fuel remains in the exhaust gas 1. The sulfur S of a high concentration of about 500 ppm is now contained in the exhaust gas 1 and will be reduced to about 50 ppm. The sulfur S forms sulfate $SO_4^2$, adheres to the carbon particles PM, or causes clogging in the reducing apparatus 6 for carbon particles PM. As a result, it has been difficult to attain accumulation by capture of the carbon particles PM and reduction by burning thereof in the reducing apparatus 6 and the filter 9.

In the catalytic converter 3, the purifier 5 on the upstream side causes nitrogen oxide NO to oxidize to nitrogen dioxide $NO_2$ which is then supplied to the reducing apparatus 6 on the downstream side. The nitrogen dioxide $NO_2$ has a function of accelerating the burning of the carbon particles PM in the reducing apparatus 6 and helps to solve the problems resulting from the sulfur S described above.

Such a burning acceleration function of nitrogen dioxide $NO_2$ is exhibited at a temperature level of about 600K. However, a sharp temperature rise to about 1,200K is pointed out in the reducing apparatus 6 of FIG. 10 and it has been almost impossible to cause the nitrogen dioxide $NO_2$ to exhibit such a burning acceleration function.

<<Third Problem>>

Third, the reducing apparatus 11 for carbon particles PM shown in FIG. 11 adopts a filter 12 of a wire mesh structure to burn the carbon particles PM in a small quantity before these reach a high temperature. Accordingly, first, it is possible to prevent the breakage by heating described above and second, a bad influence by the sulfur is avoided because the nitrogen dioxide $NO_2$ exhibits the burning acceleration function described above.

However, in this reducing apparatus 11, the filter 12 of a wire mesh structure is set within the outer cylindrical casing 4 on the same axis, and with the same diameter and cross-sectional area as the casing 4. Accordingly, there are problems inasmuch as the intake and exhaust cross-sectional area is small, resistance to the flow of the exhaust gas 1 is large, large resistance is caused by friction and the like, and pressure loss also increases. In particular, these are remarkable every time the carbon particles PM are captured and accumulated by the filter 12.

Serious problems have been pointed out inasmuch as pressure increase of the exhaust gas 1 is caused on the upstream side of the filter 12 and pressure increase within the exhaust pipe 2 is caused on the upstream side, whereby this pressure increase applies excessive load on the diesel engine to increase the driving torque. In the case where the targeted value of the driving torque is, for example, 10 N·m, the actual value has increased to about 12 N·m and as a result, it has a bad influence on the diesel engine.

It has also been pointed out that fuel consumption of the diesel engine deteriorates as the driving torque increases, and the rate of occurrence and the content by percentage of the carbon particles PM in the exhaust gas 1 increase.

<<Fourth Problem>>

Fourth, it is pointed out that there is a problem inasmuch as the reducing apparatus 6 and 11 for carbon particles PM shown in FIGS. 10 and 11 easily generate blow-off.

Namely, the carbon particles PM captured and accumulated by the filters 9 and 12 come off and are blown off in clumps before burning by the exhaust gas 1 linearly passing at a high flow rate. In this manner, the carbon particles PM are easily accumulated on the exhaust pipe 2 on the downstream side or are easily discharged outside.

In particular, in the case where the diesel engine rotates at high speed, much blow-off is generated in accordance with the increase of flow volume and flow rate of the exhaust gas 1.

SUMMARY OF THE INVENTION

<<The Present Invention>>

A reducing apparatus for carbon particles of the present invention was developed to solve the problems found in the conventional examples in view of the actual circumstances described above. The reducing apparatus is provided with one or more filters having a wire mesh structure. A first invention is characterized in that the filter formed in a substantially short column-shape is provided with a central through-hole and a pair of exhaust ducts, and is disposed on an axis perpendicular to an outer cylindrical casing. The second invention is characterized in that a plurality of filters, each formed in a cylindrical shape, is disposed parallel to and in the same axial direction as the outer cylindrical casing.

The two inventions are also characterized in that a predetermined plate, a predetermined pressure-relief hole, a predetermined oxidation catalyst, a predetermined mesh density, a predetermined wire diameter, a predetermined capture rate/decreasing rate, etc. are provided, nitrogen dioxide is used, a multi-layered structure is provided, a belt-shaped material on the outermost peripheral layer is forked, or the like.

It is therefore an object of the present invention to provide an improved reducing apparatus for carbon particles which, first, can prevent breakage by heating, second, can avoid the harmful influence of sulfur, third, can prevent a harmful influence on a diesel engine, fourth, can control blow-off, and fifth, can expect a noise reduction effect.

<<First Invention>>

The following is a technical means of the present invention for solving these problems First, a reducing apparatus for carbon particles according to claim 1 is provided to capture, accumulate, oxidize, burn, and reduce the carbon particles contained in the exhaust gas of a diesel engine.

The reducing apparatus for carbon particles is characterized in that one or more filters having a wire mesh structure are provided therein and the filter is formed in a substantially short column-shape and is provided in the center with one or more through-holes, wherein the exhaust gas flows from the outer peripheral side of the filter to the central through-hole side.

With reference to claim 2, the reducing apparatus for carbon particles according to claim 1 is characterized in that the filter is composed of a wire mesh structure of which a wire made of metal is formed in a mesh shape, and the filter is housed in an outer cylindrical casing set between an exhaust pipe for the exhaust gas and is disposed on an axis perpendicular to the axis of the outer cylindrical casing.

With reference to claim 3, the reducing apparatus for carbon particles according to claim 2 comprises the filter, a pair of holding plates for blocking and holding each end of the filter therebetween, a shielding plate for partitioning the inside of the outer cylindrical casing in front and in the rear on the downstream side of the filter, and a pair of exhaust ducts for communicating between the central through-hole of the filter and the downstream side of the shielding plate via the two holding plates and the shielding plate.

With reference to claim 4, the reducing apparatus for carbon particles according to claim 3 is characterized in that the outer cylindrical casing is formed in a substantially cylindrical shape, one or more filters are formed in a substantially short column-shape, one or more central through-holes are formed in a circular shape, the two holding plates are formed in a circular flange-shape, the shielding plate is formed in a disc-shape, and the two exhaust ducts are formed in a curved cylinder-shape, respectively.

With reference to claim 5, the reducing apparatus for carbon particles according to claim 3 is characterized in that the shielding plate is provided with one or more pressure-relief holes for releasing the increased pressure toward the downstream side.

With reference to claim 6, the reducing apparatus for carbon particles according to claim 3 is characterized in that the filter is provided with one or more pressure-relief holes for releasing the increased pressure between the outer periphery and the central through-hole.

With reference to claim 7, the reducing apparatus for carbon particles according to claim 3 is characterized in that the wire of the filter is coated by adhesion of an oxidation catalyst such as platinum Pt.

With reference to claim 8, the reducing apparatus for carbon particles according to claim 3 is characterized in that mesh density of the filter is set between 10% and 35% and the wire diameter of the filter is between 0.2 mm and 0.8 mm.

With reference to claim 9, the reducing apparatus for carbon particles according to claim 3 is provided, in which the reducing apparatus for carbon particles is used along with one or more rectifying plates and one or more purifiers which are provided in order on the upstream side within the outer cylindrical casing.

The rectifying plate is entirely provided with a plurality of wall openings throughout the rectifying plate to uniformly disperse, rectify, and accelerate the exhaust gas, thereby causing the temperature to rise.

The purifier is provided with a honeycomb core made of metal of which each cell wall is coated by adhesion of an oxidation catalyst such as platinum Pt. The purifier is also provided to oxidize, burn, and reduce carbon monoxide and hydrocarbon contained in the exhaust gas, and to oxidize nitrogen oxide into nitrogen dioxide to be supplied to the downstream side.

With reference to claim 10, the reducing apparatus for carbon particles according to claim 3 is characterized in that a capture rate and a reduction rate of the carbon particles are set between 5% and 80%.

<<Second Invention>>

A reducing apparatus for carbon particles according to claim 11 is provided to capture, accumulate, oxidize, burn, and then reduce the carbon particles contained in the exhaust gas from a diesel engine.

The reducing apparatus for carbon particles is provided with a plurality of filters of a wire mesh structure and is characterized in that each filter is formed in a hollow cylinder-shape and the exhaust gas flows through the inside and outside of the filter.

With reference to claim 12, the reducing apparatus for carbon particles according to claim 11 is characterized in that each filter is composed of a wire mesh structure of which the wire made of metal is formed in a mesh shape and that the filter is housed within an outer cylindrical casing which is set in an exhaust pipe for the exhaust gas, wherein filters are disposed side by side parallel to and in the same direction as the axis of the outer cylindrical casing.

With reference to claim 13, the reducing apparatus for carbon particles according to claim 12 is provided with a pair of front and rear perforated plates in addition to each filter. The two perforated plates are provided before and after each filter to partition the inside of the outer cylindrical casing in front and in the rear.

One holed plate blocks one end of the inner space of each filter and is provided with a plurality of passing holes for the exhaust gas. The other perforated plate is provided with a plurality of passing holes for the exhaust gas in a corresponding position on the other end of the inner space of each filter.

With reference to claim 14, the reducing apparatus for carbon particles according to claim 13 is characterized in that the outer cylindrical casing is formed in a substantially cylindrical shape, each filter is formed in a cylinder-shape, the two perforated plates are formed in a disc-shape, and each passing hole is formed in a circular shape, respectively.

With reference to claim 15, the reducing apparatus for carbon particles according to claim 13 is characterized in that the wires of each filter are coated by adhesion of oxidation catalyst such as platinum Pt.

With reference to claim 16, the reducing apparatus for carbon particles according to claim 13 is characterized in that the mesh density of each filter is set between 10% and 35% and the wire diameter of each filter is between 0.2 mm and 0.8 mm.

With reference to claim 17, the reducing apparatus for carbon particles according to claim 13 is characterized in that each filter consists of a multi-layered structure and the mesh density between the adjacent layers differs.

With reference to claim 18, the reducing apparatus for carbon particles according to claim 17 is provided, in which each filter is formed by winding a belt-shaped material of each layer which continuously extends in a sheet, and the belt-shaped material of the outermost peripheral layer is branched off from the middle of the belt-shaped material of an inner layer. In this manner, each filter is characterized in that no step is provided on the outer periphery.

With reference to claim 19, the reducing apparatus for carbon particles according to claim 13 is provided, in which the reducing apparatus for carbon particles is used along with one or more rectifying plates and one or more purifiers which are provided in order on the upstream side within the outer cylindrical casing.

The current plate is entirely provided with a plurality of wall openings throughout the rectifying plate to uniformly disperse, rectify, and accelerate the exhaust gas, thereby causing the temperature to rise.

The purifier is provided with a honeycomb core made of metal of which each cell wall is coated by adhesion of an oxidation catalyst such as platinum Pt. The purifier is characterized in that carbon monoxide and hydrocarbon contained in the exhaust gas are caused to oxidize, burn and reduce, and that nitrogen oxide is caused to oxidize into nitrogen dioxide to be supplied onto the downstream side.

With reference to claim 20, the reducing apparatus for carbon particles according to claim 13 is characterized in that a capture rate and a reduction rate of the carbon particles are set between 5% and 30%.

<<Operation>>

Operation of the reducing apparatus for carbon particles according to the present invention will be described below.

① An outer cylindrical casing is set between an upstream portion and a downstream portion of an exhaust pipe for the exhaust gas.

Housed in order within the outer cylindrical casing are one or more rectifying plates, one or more purifiers, and one or more reducing apparatus for carbon particles.

② The exhaust gas first passes through the rectifying plate to be uniformly dispersed, rectified, and accelerated, wherein the temperature rises.

③ The exhaust gas is then supplied to the purifier, wherein carbonmonoxide and hydrocarbon are caused to adhere to the honeycomb core of the purifier. The carbon monoxide and the hydrocarbon are burnt by the coated oxidation catalyst to be reduced, wherein nitrogen oxide is caused to oxidize into nitrogen dioxide.

④ The exhaust gas is then supplied to the reducing apparatus for carbon particles of the present invention to pass through one or more filters. The filter of a first invention is often composed of one filter formed in a substantially short column-shape. The filter is often provided in the central part with a through-hole and is disposed on an axis perpendicular to the outer cylindrical casing. The filter is also held between a pair of holding plates, wherein a pair of exhaust ducts is provided to communicate between two openings of the central through-hole and the downstream side of the outer cylindrical casing. In this manner, the exhaust gas flows from the outer periphery of the filter to the pair of exhaust ducts via the central through-hole.

⑤ According to a second invention, a plurality of filters, each formed in a hollow cylinder-shape, is disposed in the same direction as the axis of the outer cylindrical casing and is disposed between the front and rear perforated plates within the outer cylindrical casing. One perforated plate blocks one end of the inner space of each filter and is provided with a plurality of passing holes. The other perforated plate is provided with a plurality of passing holes corresponding to the other end of the inner space of each filter. In this manner, the exhaust gas flows following curved paths via each filter between passing holes of the pair of perforated plates.

⑥ The reducing apparatus is provided to capture, accumulate, oxidize, burn, and reduce the carbon particles in the exhaust gas using such a filter.

⑦ The capture rate and the reduction rate of the carbon particles are set between 5% and 80% and between 5% and 30% respectively, and are realized based on the wire mesh structure of the filter. Further, the capture rate and the reduction rate are set and adjusted by a selective combination of oxidation catalyst coating, mesh density, wire diameter, cross-sectional area, thickness, multi-layered structure and the like of the filter.

First, in this reducing apparatus for carbon particles, since a small amount of carbon particles is captured, accumulated, and burnt soon by one or more filters, it is possible to avoid a sharp temperature rise in the filter in and to prevent breakage by heating.

Second, since the carbon particles are soon burnt, sulfur contained in the exhaust gas is unlikely to form sulfate in the filter, adhere to the carbon particles to make burning difficult and to causes clogging. Further, since a rise in temperature is avoided, nitrogen dioxide exhibits a burning acceleration function on the carbon particles. The bad influence of sulfur can be avoided even from this aspect.

Third, one or more filters are formed in a substantially short column-shape and are provided with one or more central through-holes and a pair of exhaust ducts in the first invention. In the second invention, a plurality of filters is formed in a hollow cylinder-shape. In the first and second inventions, the filter is provided with a mesh density of 35% or less, a wire diameter of 0.2 mm or more, one or more pressure-relief holes and the like.

In this manner, the intake and exhaust cross-sectional area of the filter can be increased, the resisting force of the exhaust gas to flow is controlled, and pressure loss is also less. Though a filter of wire mesh structure is adopted, a rise in pressure on the upstream side is avoided (even though the carbon particles are captured and accumulated), the diesel engine is not loaded, and a rise in driving torque is also avoided.

Fourth, it is possible to increase the intake and exhaust cross-sectional area of one or more filters and to decrease the flow velocity of the exhaust gas. Further, since the filter is used along with predetermined pair of exhaust ducts and pair of perforated plates, the exhaust gas is dispersed and flows along the curved paths. Accordingly, blow-off of the carbon particles is controlled.

Fifth, since predetermined pair of exhaust ducts and pair of perforated plates are adopted along with the filter of wire mesh structure and the exhaust gas is dispersed and flows along the curved paths while colliding with one another, a noise reduction effect is also obtained.

BRIEF DESCRIPTION OF THE DRAWINGS

The above and other objects, features and advantages of the present invention will become more apparent from the following description when taken in conjunction with the accompanying drawings.

FIG. 2 is provided to explain the embodiment of the first invention of the reducing apparatus for carbon particles. FIG. 2A is an enlarged explanatory cross-sectional view of a substantial part, FIG. 2B is a plane explanatory cross-sectional view of the substantial part, and FIG. 2C is a perspective view of a filter;

FIG. 3 is provided to explain the embodiment of the first invention of the reducing apparatus for carbon particles.

FIG. 4 is provided to explain the embodiment of the first invention of the reducing apparatus for carbon particles and shows a perspective view of each example of a filter.

FIG. 7 is provided to explain the embodiment of the second invention, in which FIG. 7A is a side view of a substantial part on the upstream side (or the downstream side) and FIG. 7B is a side view of the substantial part on the downstream side (or the upstream side);

FIG. 8 is provided to explain the embodiment of the second invention of the reducing apparatus for carbon particles, in which

FIG. 9 is an explanatory front view of an entire exhaust system;

DETAILED DESCRIPTION OF THE PREFERRED EMBODIMENTS

<<Figures>>

Preferred embodiments of a reducing apparatus for carbon particles according to the present invention will now be described in detail with reference to the accompanying drawings. FIGS. 1 through 8 are provided to explain the embodiments of the present invention.

Figure 1:
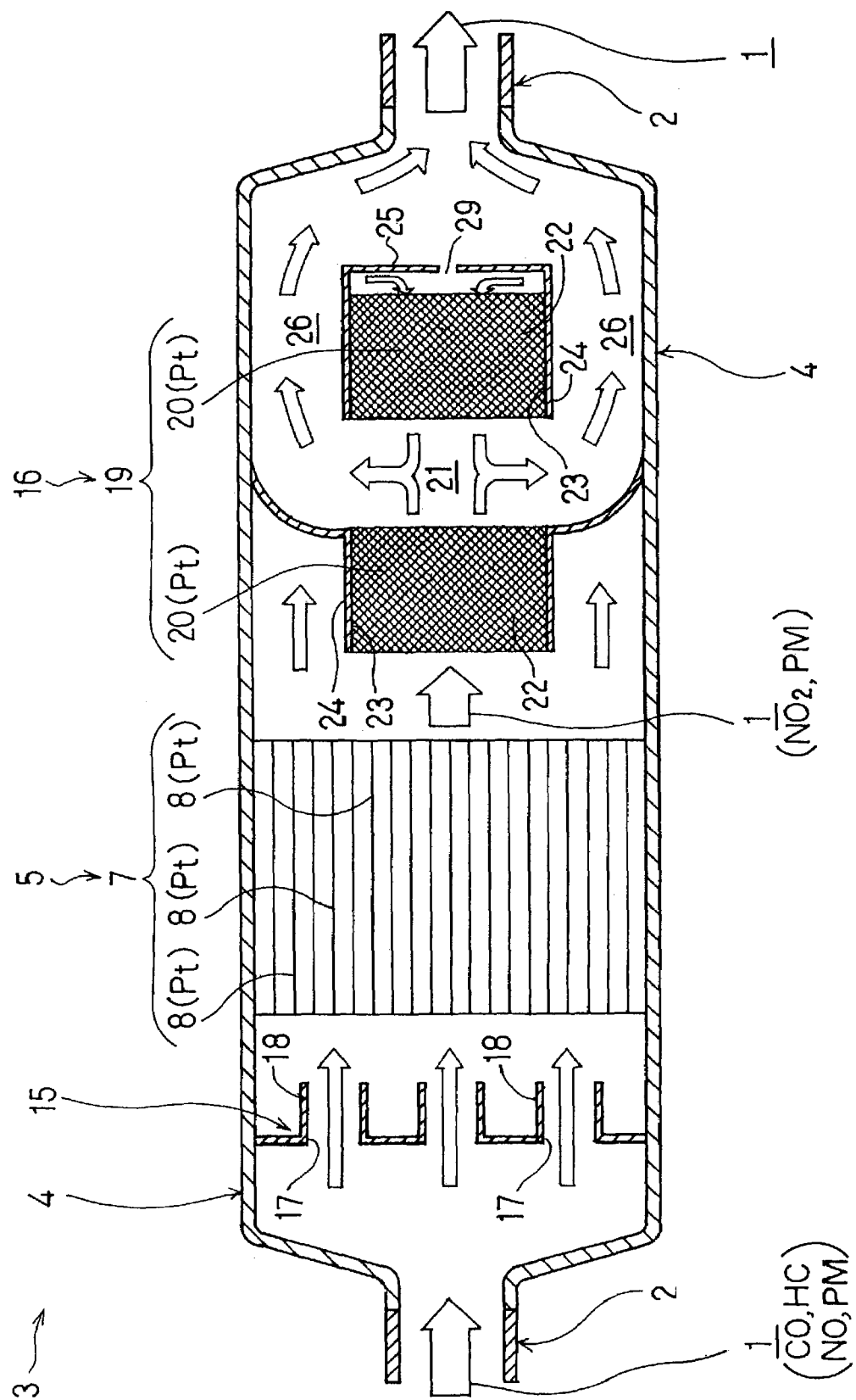
FIG. 1 is an overall explanatory cross-sectional view (i.e., an end view of a cut section) of a reducing apparatus and the like for carbon particles according to the present invention and is provided to explain an embodiment of a first invention.
Figure 3A:
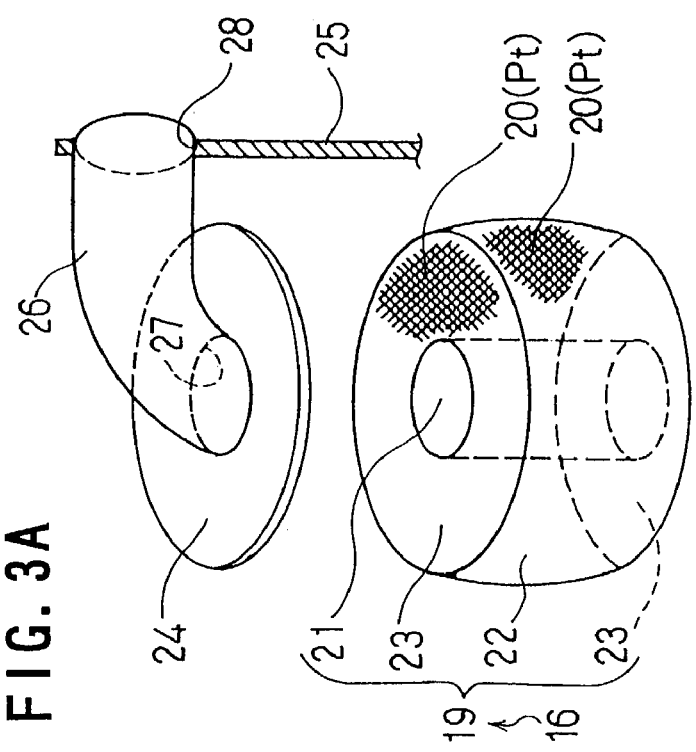
FIG. 3A is an exploded explanatory perspective view of a substantial part.
Figure 3B:
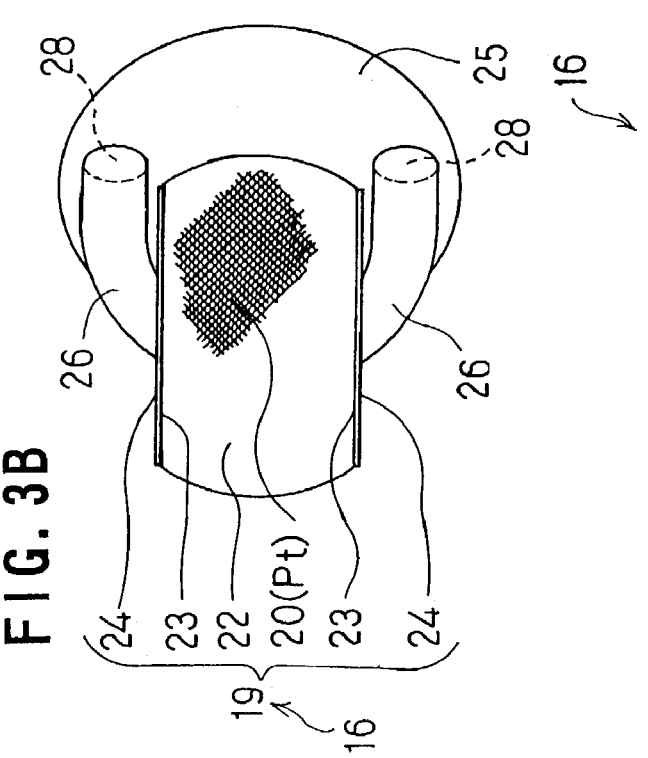
FIG. 3B is a perspective view of the substantial part.
Figure 3C:
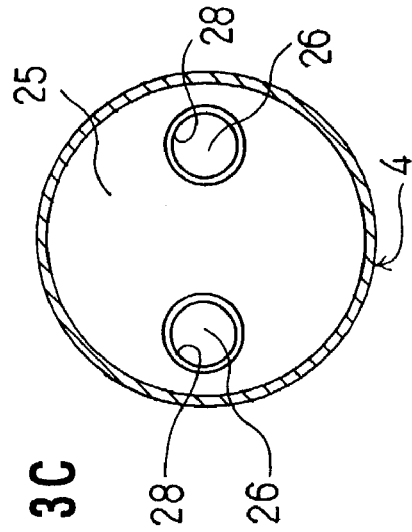
FIG. 3C is a side view of the substantial part on the downstream side.
Figure 4A:
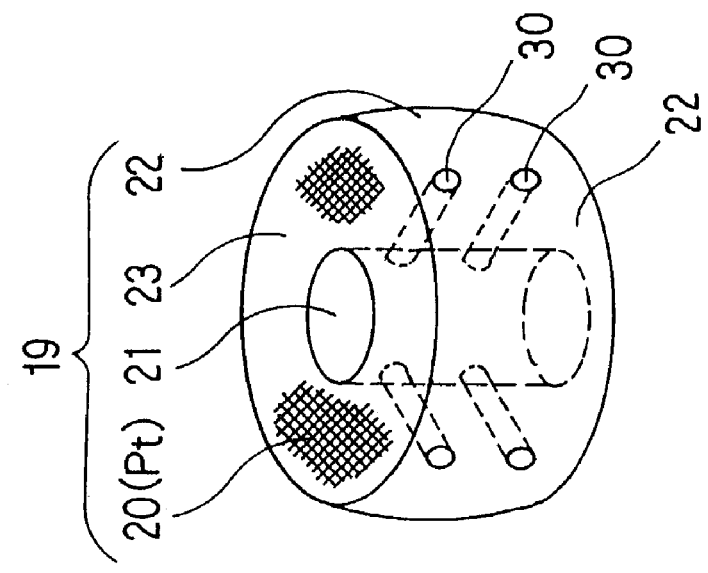
FIG. 4A shows a perspective view of one example.
Figure 4B:
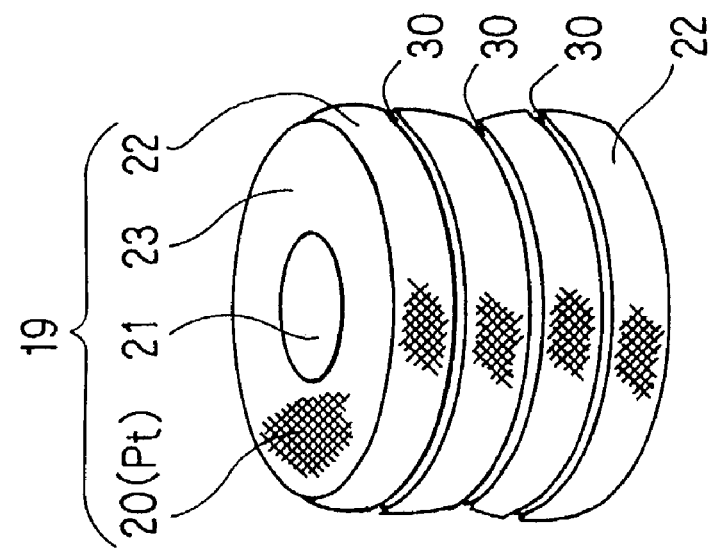
FIG. 4B shows a perspective view of another example.
Figure 4C:
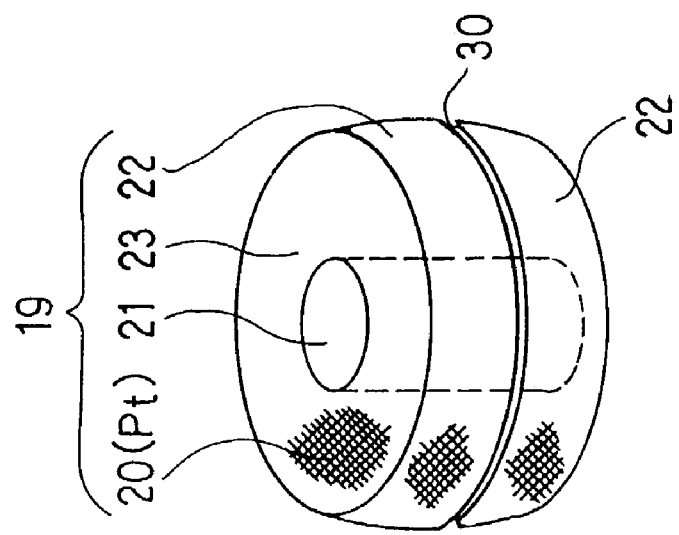
FIG. 4C shows a perspective view of a still further example.

FIG. 1 is an overall explanatory cross-sectional view (i.e., an end view of a cut section) of a first invention. FIGS. 2 through 4 are provided to explain the first invention. FIG. 2A is an enlarged explanatory cross-sectional view of a substantial part, FIG. 2B is a plane explanatory cross-sectional view of the substantial part, and FIG. 2C is a perspective view of a filter. FIG. 3A is an exploded explanatory perspective view of a substantial part, FIG. 3B is a perspective view of the substantial part, and FIG. 3C is a side view of the substantial part on the downstream side. FIG. 4 is a perspective view of each example of the filter, in which FIG. 4A shows one example, FIG. 4B shows another example, and FIG. 4C shows a still further example of the filter.

Figure 5:
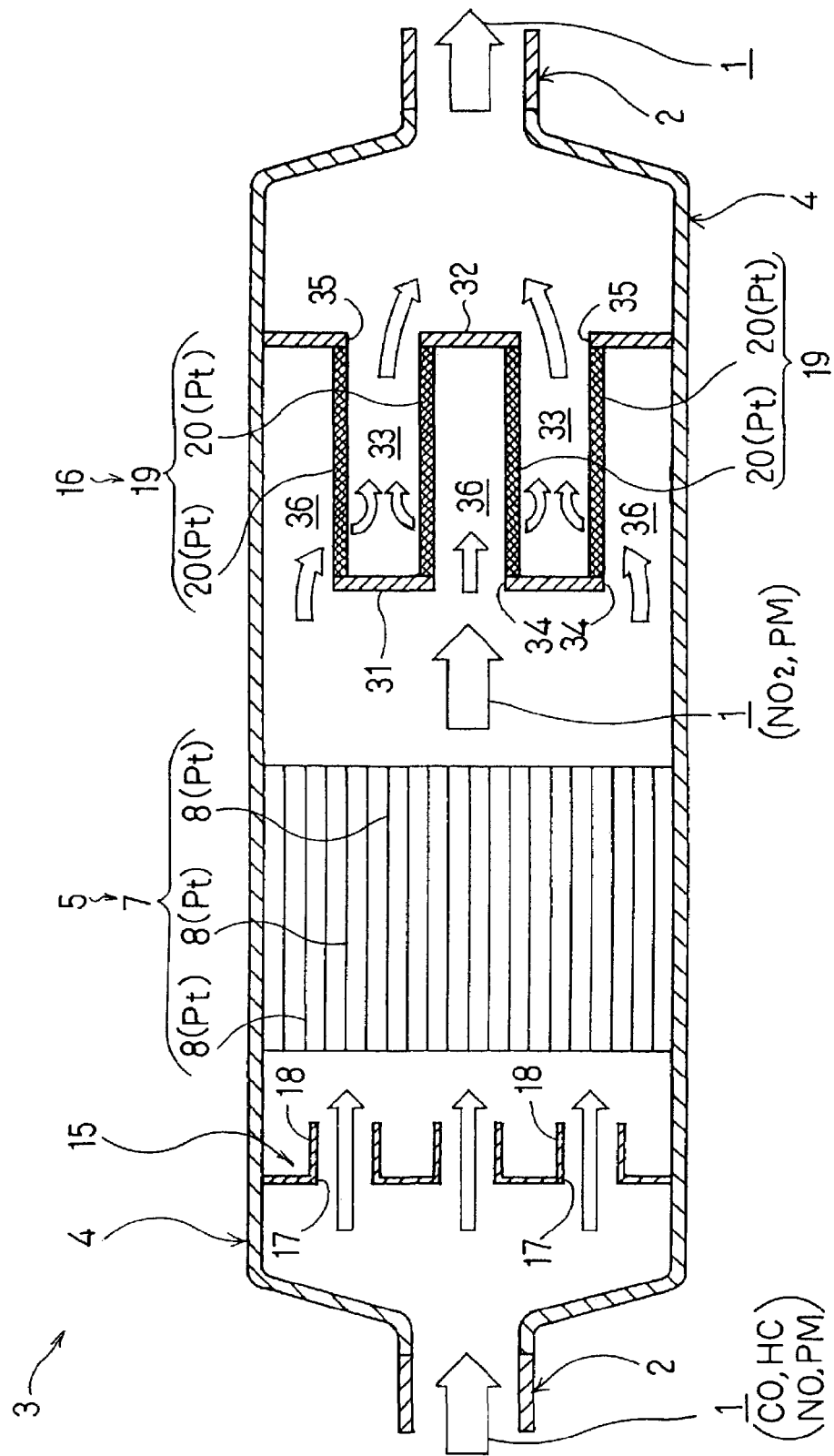
FIG. 5 is an overall explanatory cross-sectional view (i.e., an end view of a cut section) of one example of a reducing apparatus and the like for carbon particles according to the present invention and is provided to explain an embodiment of a second invention.
Figure 6:
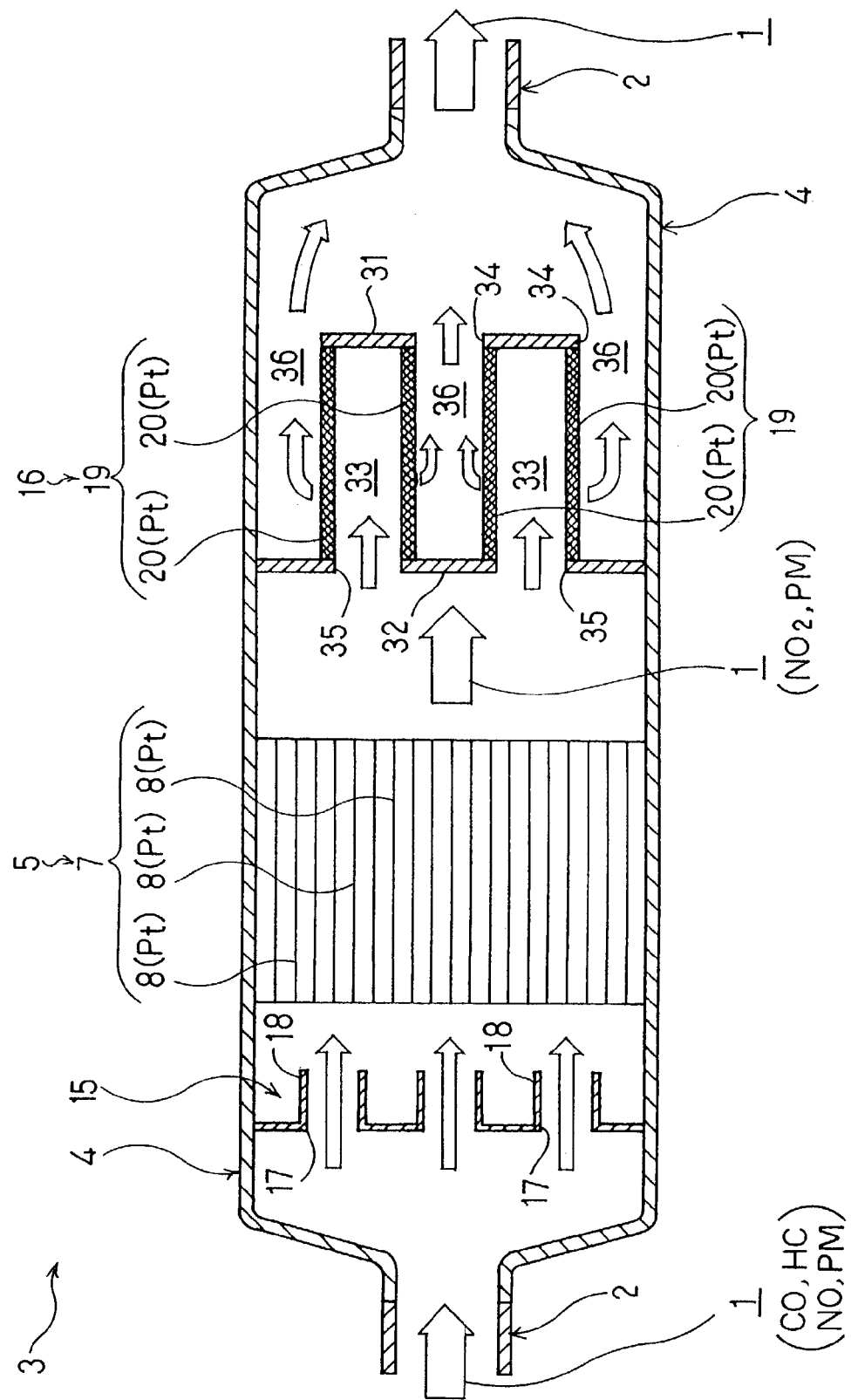
FIG. 6 is an overall explanatory cross-sectional view of another example of a reducing apparatus and the like for carbon particles according to the present invention and is provided to explain the embodiment of the second invention.

FIG. 5 is an explanatory cross-sectional view (i.e., an end view of a cut section) of one example of a second invention. FIG. 6 is an explanatory cross-sectional view (i.e., an end view of a cut section) of another example of the second invention.

Figure 8A:
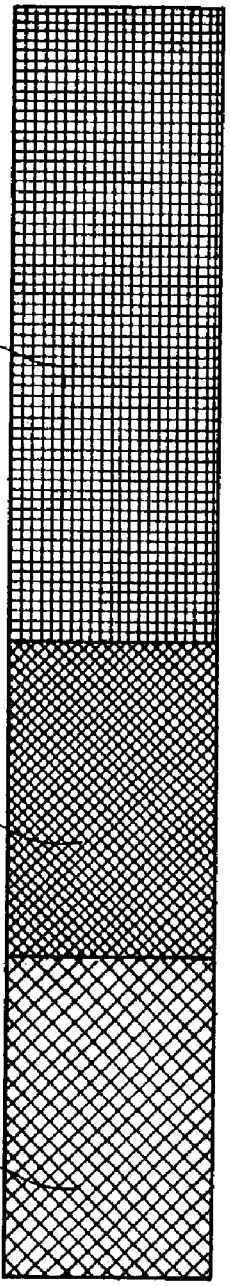
FIG. 8A is a front view of one example of a belt-shaped material and FIG. 8B is a perspective view of another example of the belt-shaped material.
Figure 8B:
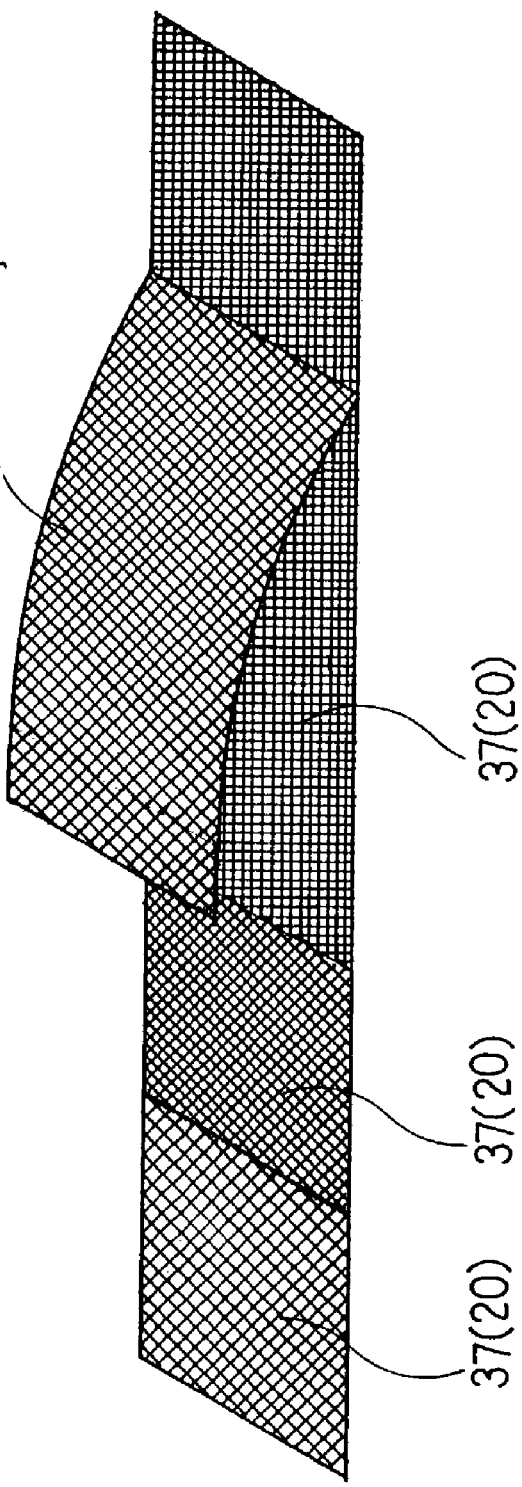
Figure 10:
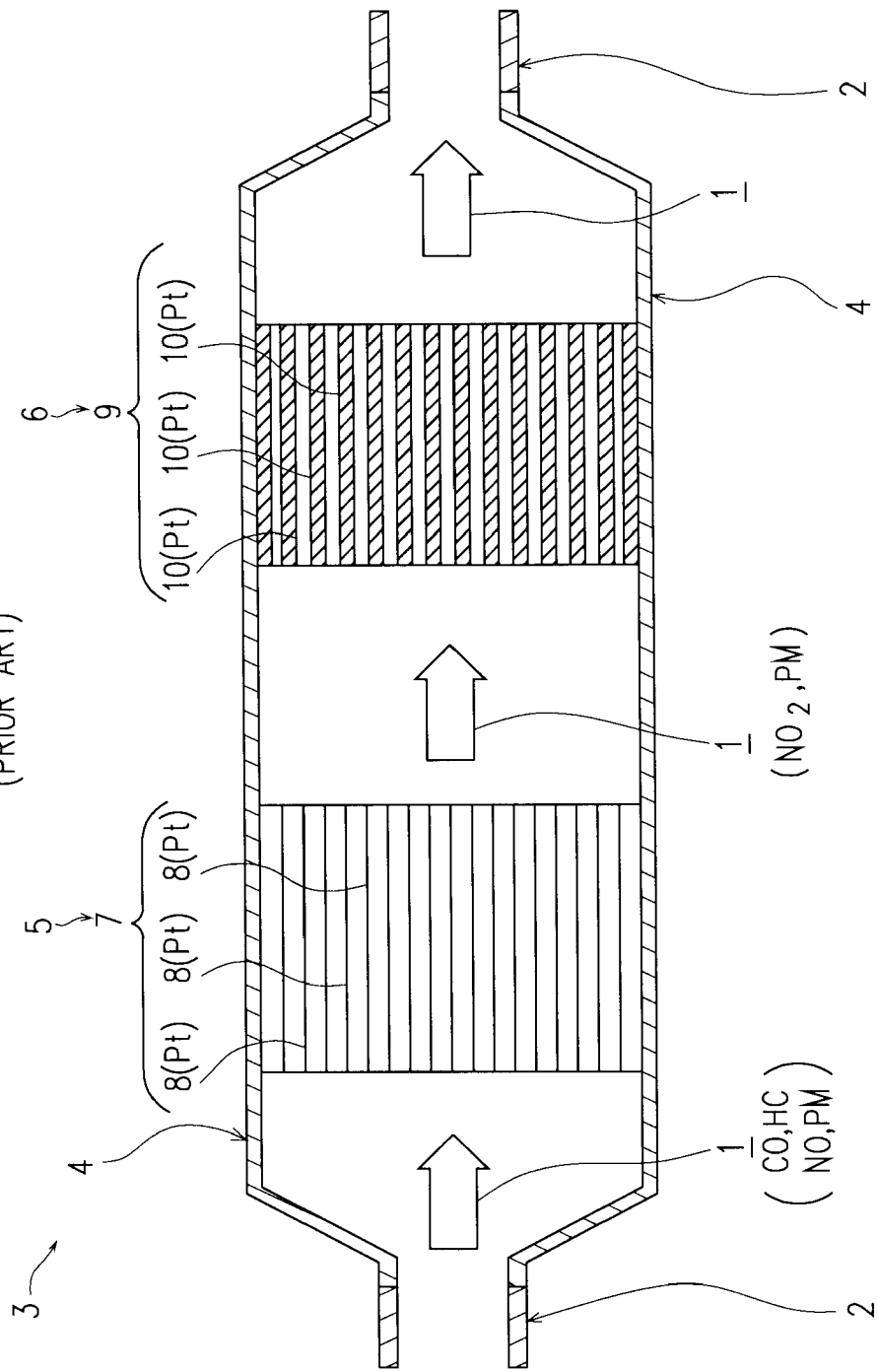
FIG. 10 is an explanatory cross-sectional view for explaining one example of a reducing apparatus and the like for carbon particles according to a conventional example of this kind.
Figure 11:
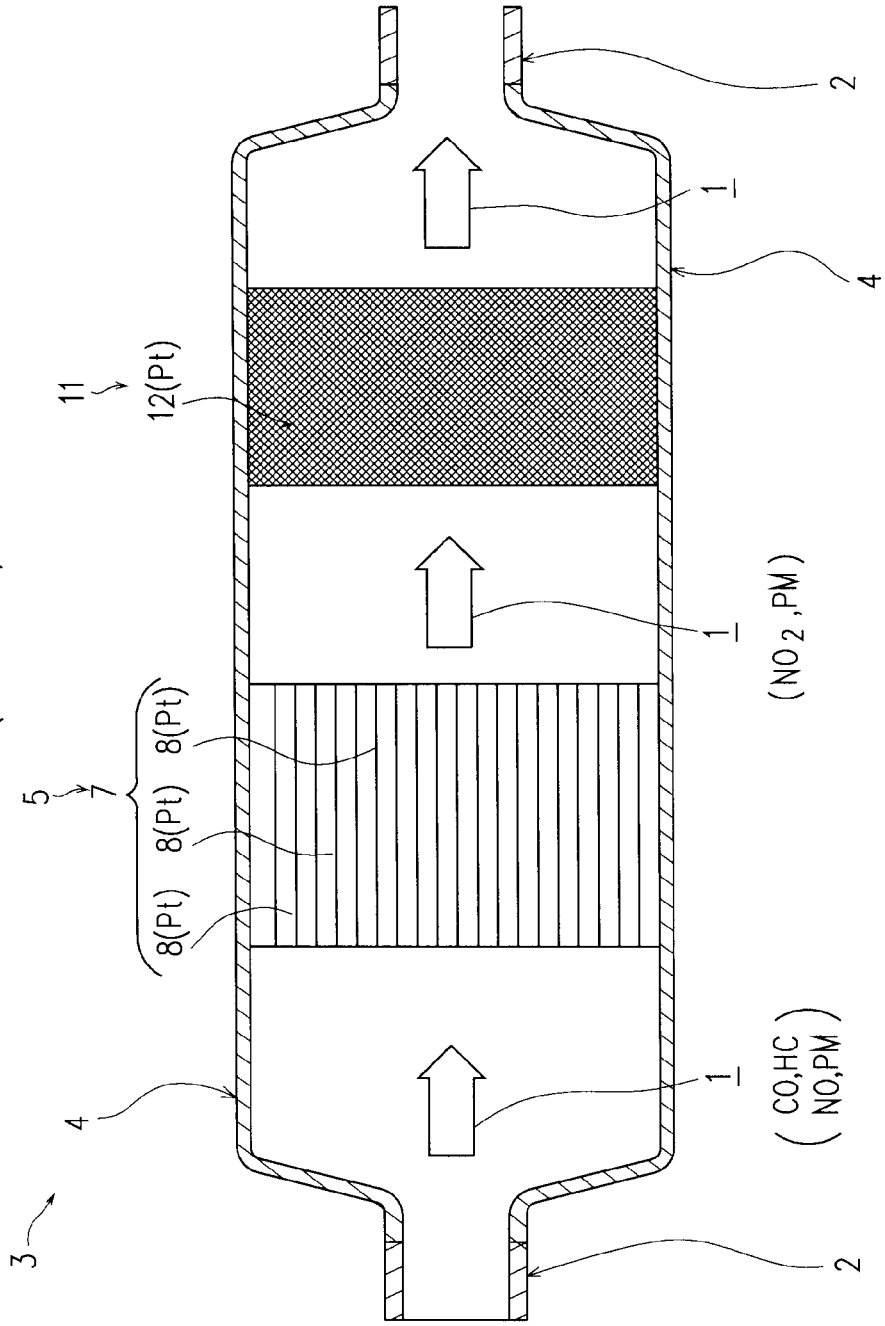
FIG. 11 is an explanatory cross-sectional view for explaining another example of a reducing apparatus and the like for carbon particles according to a conventional example of this kind.

FIGS. 7 and 8 are provided to explain the second invention. FIG. 7A is a side view of a substantial part on the upstream side (or the downstream side) and FIG. 7B is a side view of the substantial part on the downstream side (or the upstream side). FIG. 8A is a front view of one example of a belt-shaped material and FIG. 8B is a perspective view of another example of the belt-shaped material. FIG. 9 is an explanatory front view of an entire exhaust system.

<<Exhaust System>>

An exhaust system will now be explained with reference to FIG. 9. A diesel engine 13 is widely used as an internal combustion engine in automobiles, power generation, marine vessels, locomotives, aircraft, various pieces of machinery and the like. Contained in the exhaust gas 1 discharged from the diesel engine 13 are carbon monoxide CO, hydrocarbon HC, nitrogen oxides NOx, carbon particles PM and the like.

If the exhaust gas 1 containing such harmful substance is directly discharged to the open air, it contaminates and is harmful to the human body and the environment. Accordingly, for the purpose of preventing environmental pollution, a converter 3 is set in the middle of an exhaust pipe 2 for the exhaust gas 1.

Namely, fuel is supplied to the diesel engine 13 from a fuel tank 14→The diesel engine 13 discharges the exhaust gas 1 from the exhaust pipe 2→The exhaust gas 1 is discharged to the open air via the converter 3 set between the exhaust pipe 2.

The converter 3 is formed in a cylindrical or square-pipe shape of which the diameter of about 280 mm is larger than that of the exhaust pipe 2. The converter 3 is provided with an outer cylindrical casing 4 made of metal which is set between the exhaust pipe 2 on the upstream side and the exhaust pipe on the downstream side.

Detachably housed in order within the outer cylindrical casing 4 from the upstream side toward the downstream side are a current plate 15, a purifier 5 for carbon monoxide CO and hydrocarbon HC, and a reducing apparatus 16 for carbon particles PM. These are made of metal and are situated to maintain a proper distance from one another so that they are not in contact.

The exhaust system is provided as described above. Substantial parts of the system will now be explained.

<<Rectifying Plate 15>>

The rectifying plate 15 will be explained with reference to FIGS. 1, 5 and 6. The rectifying plate 15 is provided with a plurality of wall openings 17 to uniformly disperse, rectify, and accelerate the exhaust gas 1, thereby causing the temperature to rise.

The rectifying plate 15 is further described in detail. The current plate 15 is made of, for example, a disc-shaped baffle plate and is secured to the inner periphery of the outer cylindrical casing 4. Though not shown in the figure, a plurality of current plates 15 can also be provided. Wall openings 17 are drilled in an entirely regular positional relationship and are provided with extension walls 18 toward the downstream side.

The exhaust gas 1 first collides with the rectifying plate 15 and passes through each wall opening 17. In this manner, the exhaust gas 1 is first uniformly dispersed within the outer cylindrical casing 4 and then rectified to have a regular flow which goes straight (parallel to the axis of the outer cylindrical casing 4) from the upstream side to the downstream side of the casing 4.

At the same time, the exhaust gas 1 is caused to convert its energy to thermal energy by loss from collision and pressure loss increased by acceleration, thereby increasing the temperature.

The current plate 15 is provided as described above.

<<Purifier 5>>

The purifier 5 will be described with reference to FIGS. 1, 5 and 6. The purifier 5 is constructed in such a manner that each cell wall 8 of a honeycomb core 7 is coated by adhesion of an oxidation catalyst. Carbon monoxide CO and hydrocarbon HC contained in the passing exhaust gas 1 are oxidized, burnt, and reduced. At the same time, the purifier 5 oxidizes nitrogen oxide NO into nitrogen dioxide $NO_2$ to be supplied to the downstream side.

Namely, the honeycomb core 7 of the purifier 5 is made of metal and is secured to the inner periphery of the outer cylindrical casing 4. Each cell wall 8 is coated by adhesion of the oxidation catalyst such as platinum Pt, vanadium V, copper Cu, manganese Mn, and the like by way of impregnation or coating. The exhaust gas 1 passes through each cell space of a hollow column-shape formed by each cell wall 8 of such a honeycomb core 7.

The purifier 5 is provided as described above.

<<Outline of the Reducing Apparatus 16 for Carbon Particles PM>>

The reducing apparatus 16 for carbon particles PM of the present invention will be explained in detail with reference to FIGS. 1 through 8. The reducing apparatus 16 is provided with one or more filters 19 of a wire mesh structure in the first and second inventions. The reducing apparatus 16 is provided to capture, accumulate, oxidize, burn, and reduce the carbon particles PM contained in the exhaust gas 1 from the diesel engine 13.

The reducing apparatus 16 will be explained below in detail. First, the carbon particles PM are generated by the incomplete combustion of fuel in a diesel engine 13 (see FIG. 9) and consist of impure fine particle material of carbon, so-called soot which is cinders of the fuel.

In this specification, the term "carbon particles PM (particle matter)" not only means a composition of 100% carbon C, but also means a composition including about 50% of sulfur S, nitrogen N or the like.

The filter 19 is composed of a wire mesh structure of which the extra fine metal wire 20 is made of metal such as stainless steel and is vertically and laterally formed in a fine and dense mesh. The filter 19 consists of an aggregate in which the wire 20 is woven in a fiber shape or consists of a finely punched aggregate leaving the wire 20 section.

The filter 19 is provided to cause the mesh density to set between 10% and 35% and to cause the diameter of the wire 20 to be between 0.2 mm and 0.8 mm.

In the case where the mesh density (i.e., cubic volume which the wire 20 occupies) of the filter 19 is under 10% or in the case where the diameter of the wire 20 of the filter 19 is more than 0.8 mm, the mesh becomes too coarse to obtain a predetermined capture rate and reduction rate because capture and accumulation of the carbon particles PM are not sufficient.

In the case where the mesh density is more than 35%, or in the case where the diameter of the wire 20 is under 0.2 mm, the mesh becomes too dense. In this case, capture and accumulation of the carbon particles PM are too much and the pressure of the exhaust gas 1 on the upstream side is caused to rise.

The wire 20 of the filter 19 can also be coated with the oxidation catalyst such as platinum Pt by adhesion.

Namely, in the figure, the wire 20 of the filter 19 is coated by adhesion of metal or metal oxide such as platinum Pt, vanadium V, copper Cu, manganese Mn and the like as the oxidation catalyst by way of impregnation or coating.

In this manner, in the case where the filter 19 is coated with the oxidation catalyst by adhesion, burning by oxidization of the carbon particles PM in the exhaust gas 1 in the filter 19 is accelerated. Burning by oxidization of carbon monoxide CO and hydrocarbon HC slightly remaining in the exhaust gas 1 is also accelerated.

The reducing apparatus 16 is provided as described above in the first and second inventions.

<<First Invention>>

A typical example of the reducing apparatus 16 for carbon particles PM of the first invention according to the present invention is now explained with reference to FIGS. 1 through 4.

In the typical reducing apparatus 16 of the first invention shown in the figures, a filter 19 is formed in a substantially short column-shape and is provided with a central hollow through-hole 21. The filter 19 is provided on an axis perpendicular to the axis of an outer cylindrical casing 4. Exhaust gas 1 flows from the outer periphery 22 side of the filter 19 toward the central through-hole 21 side of the filter 19.

Further, the reducing apparatus 16 comprises such a filter 19, a pair of upper and lower holding plates 24 adapted to block the upper and lower ends 23 of the filter 19 and to hold the two ends therebetween, a shielding plate 25 for partitioning the inside of the outer cylindrical casing 4 in front and in the rear on the downstream side of the filter 19, a pair of upper and lower exhaust ducts 26 for communicating between the upper and lower ends of the central through-hole 21 of the filter 19 and the downstream side of the shielding plate 25 via the two holding plates 24 and the shielding plate 25. These are made of metal, respectively.

The reducing apparatus 16 of the first invention will be further described in detail. As shown in FIGS. 2 through 4, the filter 19 is formed in a substantially short column-shape of which the diameter is, for example, about 250 mm. The filter 19 is provided with a central through-hole 21 of a circular shape of which the diameter is, for example, about 90 mm.

The filter 19 is disposed on a vertical axis perpendicular to the horizontal axis of the outer cylindrical casing 4 within the outer cylindrical casing 4 while maintaining a vertical distance from the outer cylindrical casing 4. In other word, the filter 19 is disposed to cause the outer periphery 22 to face in the lateral or longitudinal direction and to cause the two ends 23 to face in the vertical direction, wherein the central through-hole 21 is vertically formed.

Though not shown in the figure, the filter 19 can also be disposed on a horizontal axis. Namely, the filter 19 can be disposed in parallel in the same direction as the axis of the outer cylindrical casing 4 to cause its outer periphery 22 to face in the vertical direction, to cause its two ends 23 to face in the lateral direction, and to cause its central through-hole 21 to be laterally formed.

The holding plates 24 are provided in pairs to have the upper and lower plates as shown in FIGS. 1 through 3. Each plate 24 is formed in a circular flange shape and is provided at the center with a hole 27. These holding plates 24 are adapted to block the circular flange-shaped upper and lower ends 23 of the filter 19 from the upper and lower sides and to hold these two ends 23 therebetween. The two holding plates 24 are secured to the shielding plate 25 using a holder or the like.

As shown in FIGS. 2 and 3, the shielding plate 25 is formed in a disc-shape and partitions the inside of the outer cylindrical casing 4 in front and in the rear while leaving some lateral space from the filter 19 on the downstream side thereof. The shielding plate 25 is secured to the inner periphery of the outer cylindrical casing 4.

As shown in FIGS. 2 and 3, the exhaust ducts 26 are provided in pairs so that the upper and lower ducts are formed in a curved cylinder-shape. The exhaust ducts are provided in such a manner that an opening section of one end (on the upstream side) is respectively connected to the upper and lower opening sections of the central through-hole 21 of the filter 19 via the holes 27 of the two holding plates 24. An opening section of the other end (on the downstream side) is respectively connected to the holes 28 respectively formed on the upper and lower sections of the shielding plate 25.

The reducing apparatus 16 of the first invention is provided to set a capture rate and a reduction rate of the carbon particles PM between 5% and 80%.

Namely, in the case where (a) the diesel engine 13 is a clean new model and the carbon particles PM content in the exhaust gas 1 is low, the capture rate and the reduction rate are set between 5% and 30%.

In the case where (b) the diesel engine 13 is an old model and the carbon particles PM content in the exhaust gas 1 is high, the capture rate and the reduction rate are set between 30% and 60%.

In the case where (c) the diesel engine 13 is an old model and the carbon particles PM content in the exhaust gas 1 is extremely high, the capture rate and the reduction rate are set between 60% and 80%.

In FIG. 2A, reference numeral 29 is a pressure-relief hole drilled at the center of the shielding plate 25. In the case where pressure of the exhaust gas 1 rises in the vicinity of the upstream side of the shielding plate 25, the pressure-relief hole 29 functions to release the pressure toward the downstream side of the shielding plate 25. It should be noted that the pressure-relief hole 29 can be provided with a valve which causes the hole 29 to open only in the case of a rise in pressure (for example, when the pressure reaches 30 KPa).

Reference numeral 30 in FIG. 4 is also a pressure-relief hole. In this case, one or more pressure relief holes 30 are formed between the outer periphery 22 and the central through-hole 21 of the filter 19. In the case where the pressure of the exhaust gas 1 rises at the periphery of the filter 19, the one or more pressure-relief holes 30 function to release the pressure toward the central through-hole 21 side.

The pressure-relief hole 30 of FIG. 4A is formed as a slit-shaped lateral hole, wherein one hole is provided. The pressure-relief hole 30 of FIG. 4B is formed as a slit-shaped lateral hole, wherein three holes are formed one above the other. The vertical width of these pressure-relief holes 30 is larger than the diameter of the carbon particles PM (e.g., 50 μm) and is for example between 2 mm and 3 mm. The pressure-relief hole 30 of FIG. 4C is formed in a through-type lateral hole shape, wherein a plurality of holes is formed vertically and horizontally. The diameter of the hole 30 is for example between 5 mm and 18 mm.

It is to be noted that the pressure-relief hole 29 of FIG. 1 and a plurality of pressure-relief holes 30 of FIG. 4 can be selectively used or used together. However, it is possible to use neither type of hole.

The reducing apparatus 16 of the first invention is provided as described above.

<<Second Invention>>A typical example of the reducing apparatus 16 for carbon particles PM of a second invention according to the present invention will now be explained with reference to FIGS. 5 through 8.

In the reducing apparatus 16 of the second invention, a plurality of filters 19, each formed in a hollow cylinder-shape, is provided side by side in the same direction as the axis of an outer cylindrical casing 4. The exhaust gas 1 flows through the inside and outside of these filters 19.

Further, the reducing apparatus 16 is provided with a pair of front and rear perforated plates 31 and 32 in addition to each filter 19. The two perforated plates 31 and 32 are situated before and after each filter 19 to partition the inside of the outer cylindrical casing 4 in the lateral direction.

One perforated plate 31 is provided to respectively block one end of the inner space 33 of each filter 19 and is provided with a plurality of passing holes 34 for the exhaust gas 1. The other perforated plate 32 is provided with a plurality of passing holes 35 for the exhaust gas 1 in a corresponding position on the other end of the inner space 33 of each filter 19.

The reducing apparatus 16 of the second invention will now be explained in detail. First, each filter 19 is formed in a hollow cylinder-shape as shown in FIGS. 5 and 6. Four filters (see FIG. 7B), each having the same shape and the same distance from one another, are laterally provided side by side in parallel in the same direction as the axis of the outer cylindrical casing 4 which forms the horizontal axis. The inside of the filters 19 forms the inner space 33.

The two perforated plates 31 and 32 are formed in a disc-shape made of metal and are secured to the inner periphery of the outer cylindrical casing 4 to partition the inside of the outer cylindrical casing 4 in the lateral direction. The two perforated plates 31 and 32 are provided before and after each filter 19 to hold the same filter 19.

One perforated plate 31 shown in FIG. 7A is situated on the upstream side in the example of FIG. 5 and is situated on the downstream side in the example of FIG. 6.

The perforated plate 31 is provided to block one end of the inner space 33 of each filter 19 (an upstream end in the example of FIG. 5; a downstream end in the example of FIG. 6). The perforated plate 31 is also provided with five passing holes 34 of a circular shape. Each passing hole 34 is drilled on the inside and the outside in such a positional relationship as to avoid the inner space 33 of each filter 19.

The other perforated plate 32 shown in FIG. 7B is situated on the downstream side in the example of FIG. 5 and is situated on the upstream side in the example of FIG. 6.

The perforated plate 32 is provided with four passing holes 35 for the exhaust gas 1. Each passing hole 35 is drilled on the other end of the inner space 33 of each filter 19 (i.e., the downstream end in the example of FIG. 5; the upstream end in the example of FIG. 6) to provide an opening in a corresponding position.

In the reducing apparatus 16 in the example of FIG. 5, the exhaust gas 1 flowing within the outer cylindrical casing 4 flows from the upstream side of the outer cylindrical casing 4 to the downstream side along the following paths:

From each passing hole 34 of one perforated plate 31 on the upstream side→Outer space 36 formed between the two perforated plates 31 and 32→(Vertically) from the outside to the inside of each filter 19→Inner space 33 of each filter 19→Each passing hole 35 of the other perforated plate 32 on the downstream side→To the downstream side within the outer cylindrical casing 4

In the reducing apparatus 16 in the example of FIG. 6, the exhaust gas 1 flowing within the outer cylindrical casing 4 flows as follows:

From each passing hole 35 of the other perforated plate 32 on the upstream side→Inner space 33 of each filter 19→(Vertically) from the inside to the outside of each filter 19→Outer space 36 formed between the two perforated plates 31 and 32→Each passing hole 34 of one perforated plate 31 on the downstream side→To the downstream side within the outer cylindrical casing 4

The reducing apparatus 16 of the second invention in the examples of FIGS. 5 and 6 is provided to set a capture rate and a reduction rate of carbon particles PM between 5% and 30%. Namely, the reducing apparatus 16 is used when the diesel engine 13 is a clean new model and the carbon particles PM content in the exhaust gas 1 is low.

Further, the reducing apparatus 16 can be considered to provide each filter 19 of a multi-layered structure of which the cylindrical wall is superposed in multi-layer and the mesh density between the adjacent layers is caused to differ. In this manner, there is the advantage that each filter 19 with different mesh density can easily cope with the carbon particles PM having various diameters and the capture and accumulation of the carbon particles PM can be ensured.

As shown in FIG. 8A, each filter 19 having the multi-layered structure can be formed in a cylindrical shape by causing a belt-shaped material 37 of each layer to continuously extend long in a sheet in advance and then rolling up this belt-shaped material 37 while leaving the inner space 33 therein. In this case, one layer is formed in one or two rolls of the belt-shaped material 37.

As shown in FIG. 8B, if the belt-shaped material 37 of the outermost peripheral layer 38 is branched off in advance from the middle of the belt-shaped material 37 of the inner layer before being rolled up, and then one end of the belt-shaped material 37 of the outermost peripheral layer 38 is caused to face the other end in close contact, a cylindrical filter 19 having no step on the outer periphery can be obtained.

The reducing apparatus 16 of the second invention is provided as described above.

<<Operation, Etc.>>

The reducing apparatus according to the present invention is constructed as described above. Operation of the apparatus is performed as follows:

①  The exhaust gas 1 discharged from the diesel engine 13 contains carbon monoxide CO, hydrocarbon HC, nitrogen oxides $NO_x$, carbon particles PM and the like in a floating condition.

An outer cylindrical casing 4 of a converter 3 is set between an exhaust pipe 2 for the exhaust gas 1. Housed in order within the outer cylindrical casing 4 are a current plate 15, a purifier 5, a reducing apparatus 16 for carbon particles PM and the like from the upstream side (see FIG. 9).

② The exhaust gas 1 is first supplied to the rectifying plate 15 and passes through each wall opening 17 to be uniformly dispersed, rectified and accelerated, thereby causing the temperature to rise (see FIGS. 1, 5 and 6).

③ The exhaust gas 1 is then supplied to a purifier 5 and passes through the honeycomb core 7 (see FIGS. 1, 5, and 6). Since the exhaust gas 1 has been uniformly dispersed and rectified and the temperature has been risen in advance in the step (②), carbon monoxide CO and hydrocarbon HC contained in the exhaust gas 1 are entirely and sufficiently oxidized, burnt, and effectively reduced by the oxidation catalyst such as platinum Pt of each cell wall 8 of the honeycomb core 7.

Nitrogen oxide NO contained in the exhaust gas 1 is oxidized into nitrogen dioxide $NO_2$ to be supplied to the downstream side.

④ The exhaust gas 1 is then supplied to the reducing apparatus 16 for carbon particles PM of the present invention and passes through one or more filters 19 of a wire mesh structure of which the wire 20 is formed in a fine mesh-shape.

The filter 19 of the reducing apparatus 16 according to the first invention is for example formed in a substantially short column-shape and is provided with a central through-hole 21 of a circular shape. The filter 19 is disposed on a vertical axis perpendicular to the lateral axis of the outer cylindrical casing 4 of a substantially cylindrical shape (see FIGS. 1 through 3). The upper and lower ends 23 of the filter 19 are held by a pair of upper and lower holding plates 24 which are, for example, formed in a circular flange-shape. A pair of upper and lower exhaust ducts 26 of a cylindrical shape is provided to communicate between the upper and lower ends of the central through-hole 21 and the downstream side of a shielding plate 25.

In such a first invention, the exhaust gas 1 first collides with the outer periphery 22 of the filter 19 and flows from the outside to the inside of the filter 19, in other words, from the outer periphery 22 side to the central through-hole 21 side. The exhaust gas 1 then flows toward the downstream side via the curved two exhaust ducts 26 from the upper and lower ends of the central through-hole 21.

⑤ Each filter 19 of the reducing apparatus 16 according to the second invention is formed for example in a hollow cylinder-shape, wherein a plurality of filters is provided, each disposed side by side in the same direction as the lateral axis of the outer cylindrical casing 4 of a substantially cylindrical shape (see FIGS. 5 and 6).

Disposed before and after each filter 19 to partition the inside of the outer cylindrical casing 4 in the lateral direction is a pair of front and rear perforated plates 31 and 32 of, for example, a disc-shape.

One perforated plate 31 is provided to block one end of the inner space 33 of each filter 19 and is provided with a plurality of passing holes 34 of, for example, a circular shape for the exhaust gas 1. The other perforated plate 32 is provided with a plurality of passing holes 35 of, for example, a circular shape for the exhaust gas 1 in a corresponding position on the other end of the inner space 33 of each filter 19.

In such a second invention, the exhaust gas 1 flows onto the downstream side between the passing holes 34 and 35 of the front and rear perforated plates 31 and 32. In this case, the exhaust gas 1 first collides with each filter 19, then flows from the inside to outside (vertically) of each filter 19, passes following the curved paths between the inner space 33 and the outer space 36 of each filter 19, and then flows onto the downstream side.

⑥ The reducing apparatus 16 for carbon particles PM according to these first and second inventions captures, accumulates, oxidizes, burns and reduces the carbon particles PM contained in the passing exhaust gas 1 using one or more filters 19 of a wire mesh structure.

The exhaust temperature of the exhaust gas 1 of the diesel engine 13 is between 400K and 600K during normal revolution and is about 800K during high-velocity revolution. The carbon particles PM captured and accumulated by the filter 19 break into a spontaneous flame and burn based on such an exhaust temperature.

⑦ The capture rate and the reduction rate of such carbon particles PM are set between 5% and 80% in the first invention and between 5% and 30% in the second invention.

These capture rates and reduction rates are basically realized based on the adoption of the filter 19 with a wire mesh structure (The carbon particles PM are effectively captured and reduced by collision with the wire mesh structure). More specifically, these capture rates and reduction rates can be set and adjusted by selectively combining the following points taking the content of the carbon particles PM estimated in the exhaust gas 1 into consideration:

(a) Presence of coating by adhesion of oxidation catalyst onto the wire 20 of the filter 19;

(b) Selection of mesh density of the filter 19 between 10% and 35%;

(c) Selection of the wire 20 diameter of the filter 19 between 0.2 mm and 0.8 mm;

(d) Determination of numerical value of the cross-sectional area and thickness for intake and exhaust of the filter 19 (i.e., cubic volume necessary to capture and reduce); and (e) In the second invention, each filter 19 should be formed in a multi-layered structure and the mesh density between the adjacent layers should be different (see FIG. 8).

In such capture rate and reduction rate, the carbon particle PM of for example 200 mg/m$^3$ are reduced to 60 mg/m$^3$ to realize the reduction rate of 70% (when sulfur S is 50 ppm). The remaining carbon particles PM not captured and reduced are discharged directly to the open air. As a result, since only a small amount of carbon particles PM is discharged, it should be considered within the allowance.

<<Advantages>>

The reducing apparatus 16 for carbon particles PM according to the first and second inventions has the advantages described in the following points 1 through 5:

First, according to this reducing apparatus 16, in the capture rate and reduction rate between 5% and 80% (remarkably reduced from 95%), the carbon particles PM in the exhaust gas 1 are captured and accumulated in a comparatively small quantity (before being captured and accumulated in a large quantity), are oxidized and burnt soon (before the temperature becomes high), and are reduced.

According to this reducing apparatus 16, a sharp rise in temperature of the filter 19 can be avoided and as a result, heat breakage of the filter 19 can be prevented. The temperature of the filter 19 resulting from burning can be controlled to a temperature level of about 600K. The maximum temperature of the filter 19 is about 900K and does not reach 1,200K.

Further, since the filter 19 is composed of a trapping wire mesh structure, it is flexible. Accordingly, even though the carbon particles PM are accumulated, the filter 19 still has a degree of freedom. Cleaning of cinders of the carbon particles PM is also easy. Breakage can be prevented from these aspects.

Second, according to the reducing apparatus 16, the carbon particles PM are captured and accumulated in a small amount, and oxidized and burnt soon under a capture rate and reduction rate between 5% and 80%.

In this manner, it is possible to avoid the adverse influence of sulfur S contained in the fuel and the exhaust gas 1 of the diesel engine 13. In other words, the problems of the sulfur S forming sulfate $SO_4^2$, adhering to the carbon particles PM to make burning difficult, or causing clogging in the filter 19 can be avoided. Even though sulfur S of not only about 50 ppm, but also 500 ppm is contained, the carbon particles PM are burnt quickly in a small quantity and as a result, it is difficult to generate an adverse influence due to sulfur S.

As described above, since the filter 19 is provided in such a manner as to avoid the sharp rise in temperature and the temperature is controlled to a level of about 600K, nitrogen dioxide $NO_2$ supplied from the upstream side can exhibit its function. Further, since the nitrogen dioxide $NO_2$ surely exhibits the burning acceleration function of the carbon particles PM, it is possible to avoid the adverse influence due to sulfur S from this aspect.

Third, in the first invention, the reducing apparatus 16 is provided in which a filter 19 is formed in a substantially short column-shape with a central through-hole 21 and is disposed on an axis perpendicular to an outer cylindrical casing 4. Further, the exhaust duct 26 is provided in pairs to secure a wide cross-sectional area for exhaust. In the second invention, a plurality of filters 19, each formed in a cylinder-shape, is disposed side by side on the same axis as the outer cylindrical casing 4. Further, in the first and second inventions, the filter 19 is provided with a mesh density of 35% or less and has a wire 20 diameter of 0.2 mm or more.

In this manner, in the reducing apparatus 16 of the first and second inventions, it is possible to make the cross-sectional area for supply and exhaust of the filter 19 larger by making the length of one or more filters in the axial direction larger. Further, in the filter 19, resistance of the exhaust gas 1 to the flow is reduced, generation of resistance force by friction and the like is controlled, and pressure loss is also less.

Especially in the second invention, since each filter 19 is formed in a thin hollow cylinder-shape, these effects are remarkable even in this condition. On the contrary, in the first invention, pressure-relief holes 29 and 30 for releasing the increased pressure into the downstream side as a bypass are provided on the shielding plate 25 on the downstream side or between the outer periphery 22 and the central through-hole 21 of the filter 19.

In this manner, though the reducing apparatus 16 of the first and second inventions adopts the filter 19 of a wire mesh structure (and even in the case where the carbon particles PM are captured and accumulated by the filter 19), it is possible to prevent a rise in the pressure of the exhaust gas 1 on the upstream side of the filter 19.

Further, since a rise in pressure within the exhaust pipe 2 on the upstream side is avoided, application of excessive load on the diesel engine 13 is controlled, and a rise in driving torque is avoided, an adverse influence on the diesel engine 13 can be prevented. In the case where the targeted value of the driving torque is, for example, 10 N·m, the actual value is only 10.5 N·m.

Since pressure loss is less and rise in pressure is also avoided, it is possible to prevent heat breakage and pressure breakage of the filter 19 from this aspect.

Fourth, as described above, since the reducing apparatus 16 can make the cross-sectional area for supply and exhaust of one or more filters 19 larger, the flow velocity of the exhaust gas 1 can be lowered accordingly.

The filter 19 is used along with a pair of curved exhaust ducts 26 in the first invention and is used along with a pair of hole-provided plates 31 and 32 having passing holes 34 and 35 in the second invention. Accordingly, the exhaust gas 1 is dispersed and flows along the curved and bent paths.

Thus, in this reducing apparatus 16, generation of blow-off is controlled compared with a case where the exhaust gas 1 linearly flows at high velocity. It is also controlled so that the carbon particles PM captured and accumulated by the filter 19 come off in clumps before burning and are blown off on the downstream side.

Fifth, the reducing apparatus 16 adopts one or more filters 19 of a wire mesh structure. In combination with the filter 19, a pair of curved exhaust ducts 26 is adopted in the first invention, while a pair of hole-provided plates 31 and 32 provided with passing holes 34 and 35 is adopted in the second invention., Thus, in the reducing apparatus 16, since the exhaust gas 1 flows while being diffused, dispersed, curved and bent, a noise reduction effect is exhibited compared with the case where the exhaust gas 1 flows linearly. Noise from the diesel engine 13 is reduced because the exhaust gas 1 flows colliding with one another to deny the wavelength.

<<Features of the Present Invention>>

As described above, the reducing apparatus for carbon particles according to the present invention adopts one or more filters of a wire mesh structure. In the first invention, the reducing apparatus for carbon particles is characterized in that the filter is formed in a substantially short column-shape and is provided with a central through-hole and a pair of exhaust ducts, and the filter is disposed on an axis perpendicular to an outer cylindrical casing. In the second invention, the reducing apparatus for carbon particles is characterized in that a plurality of filters, each formed in a cylinder-shape, is disposed in parallel in the same direction as the axis of the cylindrical casing.

Further, the two inventions are also characterized in that a predetermined plate, a predetermined pressure-relief hole, a predetermined oxidation predetermined catalyst, a predetermined mesh density, a predetermined wire diameter, a predetermined capture rate and a predetermined reduction rate are provided, and nitrogen dioxide is used, a multi-layered structure is adopted, and a belt-shaped material on the outermost peripheral layer is forked.

The reducing apparatus for carbon particles of the present invention exhibits the following five effects.

<<First Effect>>

First, breakage by heating is prevented. Namely, the reducing apparatus of the present invention is provided to set a capture rate and a reduction rate of the carbon particles between 5% and 80% and between 5% and 30% respectively. In this manner, the carbon particles are captured in a small amount and burnt quickly and as a result, a sharp rise in temperature of one or more filters is avoided. This can be further ensured by utilization of nitrogen dioxide supplied from the upstream side.

In the conventional reducing apparatus of this kind made of ceramics described above, a large amount of carbon particles is captured and accumulated, and then burnt at one time. As a result, the capture rate and the reduction rate become 95% or more and the maximum temperature is about 1,200K. On the other hand, in the reducing apparatus according to the present invention, the temperature is controlled at a level of about 600K and heat breakage of the filter can be prevented.

Further, the reducing apparatus of the present invention is provided to make the filter flexible and to make cleaning easy. Thus, the reducing apparatus is not easily broken and is superior in strength compared with the conventional example of this kind from this aspect.

In the reducing apparatus of the present invention, a cycle of accumulation by capture of carbon particles, burning by oxidization, accumulation by capture of new carbon particles, and burning by oxidization can be repeated in order. Though the conventional example of this kind breaks in about a week because of breakage from heating, the reducing apparatus of the present invention can be continuously used at least for about 250 hours. Thus, the reducing apparatus of the present invention is superior in durability and cost, and has a long life.

<<Second Effect>>

Second, an adverse influence from sulfur is avoided. Namely, as described above, the reducing apparatus of the present invention is provided to capture the carbon particles in the exhaust gas in a small quantity and burn these quickly.

In such a reducing apparatus of the conventional example of this kind as described above, sulfur in the exhaust gas forms a sulfate, adheres to the carbon particles to make burning difficult, and causes clogging. However, the reducing apparatus of the present invention reduces this remarkably.

In addition to the above, as described above, in the reducing apparatus of the present invention, since the temperature of the filter is controlled at a low level, nitrogen dioxide supplied from the upstream side can exhibit a burning acceleration function of the carbon particles which cannot be seen in the conventional example of this kind. An adverse influence by sulfur can thus be avoided from this aspect.

<<Third Effect>>

Third, an adverse influence on the diesel engine is prevented. Namely, the reducing apparatus of the present invention adopts one or more filters of a wire mesh structure. In the first invention, the filter formed in a substantially short column-shape is provided with a central through-hole and a pair of exhaust ducts and is disposed on an axis perpendicular to an outer cylindrical casing. In the second invention, a plurality of filters, each formed in a hollow cylindrical shape, is disposed in the same direction as the axis of the outer cylindrical casing. Further, the filter is provided with a predetermined mesh density and wire diameter and is also provided with a pressure-relief hole.

In this manner, the reducing apparatus of the present invention reduces the resistance of the exhaust gas to flow compared with the reducing apparatus of the conventional example of this kind having such a wire mesh structure as described above. Accordingly, a rise in pressure on the upstream side is avoided, and applying an excessive load on the diesel engine to increase the driving torque is also avoided.

Thus, fuel consumption of the diesel engine improves and as a result, a rate of occurrence and an increase of the content of carbon particles in the exhaust gas are also avoided. Breakage from heat and pressure on the filter is also avoided. The reducing apparatus of the present invention is thus superior in durability from this aspect.

<<Fourth Effect>>

Fourth, blow-off is also controlled. Namely, in the reducing apparatus of the present invention, the exhaust gas flows at a low velocity, following the bent paths.

Accordingly, the reducing apparatus of the present invention is provided to control the blow-off compared with the conventional example of this kind described above in which the exhaust gas linearly flows at a high velocity. In particular, generating much blow-off during high revolution of the engine to cause the blow-off to remain on the exhaust pipe on the downstream side or to be discharged to the outside is avoided.

<<Fifth Effect>>

Fifth, a noise reduction effect is also exhibited. Namely, the reducing apparatus of the present invention adopts one or more filters of a wire mesh structure and paths bent and dispersed by the two exhaust ducts and the two perforated plates in combination.

Accordingly, the reducing apparatus of the present invention exhibits a silencer effect which cannot be expected by the reducing apparatus of the conventional example of this kind described above in which the exhaust gas flows linearly. Thus, noise is reduced when the exhaust gas is discharged to the outside.

In the second invention, in the case where each filter is formed in a multi-layered structure and a belt-shaped material of a branched outermost peripheral layer is used, a filter having no steps on the outer periphery is obtained.

In this manner, the effect which the present invention exhibits is very remarkable whereby all the problems of the conventional example of this kind can be solved.

What is claimed is:

1. A reducing apparatus for carbon particles having one or more filters housed in an outer cylindrical casing set between an upstream portion and a downstream portion of an exhaust pipe for the exhaust gas and comprised of a flexible wire mesh structure of predetermined mesh density of from between 10% and 35% based on cubic volume and constructed of wire of a diameter between 0.2 mm and 0.8 mm, which captures, accumulates, oxidizes, burns, and reduces the carbon particles contained in the exhaust gas of a diesel engine, characterized in that the filter is formed by rolling a belt of mesh to form layers surrounding an open central through-hole into a substantially toroidal-shape, a shielding plate for partitioning the inside of the outer cylindrical casing in the lateral direction on the downstream side of the filter and at least one exhaust duct extending from a central through hole in said filter to the downstream portion of the exhaust pipe, wherein the exhaust gas flows from an outer peripheral side of the filter through the layers of mesh to the central through-hole side thereof and to the downstream portion of the exhaust pipe via said at least one exhaust duct and inwardly in the opposite direction through the mesh past said shielding plate; wherein the capture rate and the reduction rate of the carbon particles are set between 5% and 80%; the apparatus further comprising a pair of holding plates for blocking and holding the two ends of the filter, and wherein the holding plates hold a pair of exhaust ducts for communicating between the central through-hole of the filter and the downstream side of the exhaust pipe via the two holding plates and the shielding plate; wherein the filter is disposed on an axis perpendicular to an axis of the outer cylindrical casing.

2. A reducing apparatus for carbon particles having one or more filters housed in an outer cylindrical casing set between an upstream portion and a downstream portion of an exhaust pipe for the exhaust gas wherein the filter is disposed on an axis perpendicular to an axis of the outer cylindrical casing and is comprised of a metal wire mesh structure, which capture, accumulate, oxidize, burn, and reduce the carbon particles contained in the exhaust gas of a diesel engine, characterized in that the filter is formed in a substantially toroidal-shape and is provided with a pair of holding plates for blocking and holding the two ends of the filter and at least one central through hole, a shielding plate for partitioning the inside of the outer cylindrical casing in the lateral direction on the downstream side of the filter holding a pair of exhaust ducts extending from a central through hole in said filter to the downstream portion of the exhaust pipe via the two holding plates and the shielding plate, wherein the exhaust gas flows from an outer peripheral side of the filter to the central through-hole side thereof and to the downstream portion of the exhaust pipe via the exhaust ducts and inwardly in the opposite direction through the mesh past said shielding plate.

3. The reducing apparatus for carbon particles according to claim 2, wherein the outer cylindrical casing is formed in a substantially cylindrical shape, one or more filters are formed in a substantially short column-shape, one or more central through-holes are formed in a circular shape, the two holding plates are formed in a circular flange shape, the shielding plate is formed in a disc-shape, and the two exhaust ducts are formed in a curved cylindrical shape.

4. The reducing apparatus for carbon particles according to claim 2, wherein the shielding plate is provided with one or more pressure-relief holes for releasing the raised pressure onto the downstream side.

5. The reducing apparatus for carbon particles according to claim 2, wherein the filter is provided with one or more pressure-relief holes for releasing the raised pressure between the periphery and the central through-hole.

6. The reducing apparatus for carbon particles according to claim 2, wherein the wire of the filter is coated by adhesion of an oxidation catalyst comprising platinum.

7. The reducing apparatus for carbon particles according to claim 2, wherein the mesh density of the filter is set between 10% and 35%, and the wire diameter of the filter is between 0.2 mm and 0.8 mm.

8. The reducing apparatus for carbon particles according to claim 2, wherein the reducing apparatus for carbon particles is used along with one or more rectifying plates and one or more purifiers disposed in order on the upstream side within the outer cylindrical casing, the rectifying plate is entirely provided with a plurality of wall openings throughout the rectifying plate to uniformly disperse, rectify, and accelerate the exhaust gas, thereby raising the temperature, and the purifier is provided with a honeycomb core made of metal of which each cell wall is coated by adhesion of oxidation catalyst comprising platinum, and the purifier is adapted to oxidize, burn, and reduce carbon monoxide and hydrocarbon contained in the exhaust gas and to oxidize nitrogen oxide into nitrogen dioxide which is supplied to the downstream side.

9. The reducing apparatus for carbon particles according to claim 2, wherein the capture rate and the reduction rate of the carbon particles are set between 5% and 80%.

* * * * *